US008917929B2

(12) United States Patent
Ichimori

(10) Patent No.: US 8,917,929 B2
(45) Date of Patent: Dec. 23, 2014

(54) IMAGE PROCESSING APPARATUS, METHOD, PROGRAM, AND RECORDING MEDIUM

(75) Inventor: Takashi Ichimori, Tokyo (JP)

(73) Assignee: Lapis Semiconductor Co., Ltd., Yokohama (JP)

( * ) Notice: Subject to any disclaimer, the term of this patent is extended or adjusted under 35 U.S.C. 154(b) by 742 days.

(21) Appl. No.: 13/132,976

(22) PCT Filed: Mar. 15, 2011

(86) PCT No.: PCT/JP2011/056118
§ 371 (c)(1),
(2), (4) Date: Jun. 6, 2011

(87) PCT Pub. No.: WO2011/115142
PCT Pub. Date: Sep. 22, 2011

(65) Prior Publication Data
US 2011/0311130 A1    Dec. 22, 2011

(30) Foreign Application Priority Data
Mar. 19, 2010    (JP) ................................ 2010-065166

(51) Int. Cl.
G06K 9/00 (2006.01)
G01C 11/06 (2006.01)
G06T 7/00 (2006.01)

(52) U.S. Cl.
CPC ....... *G01C 11/06* (2013.01); *G06T 2207/20224* (2013.01); *G06T 2207/10012* (2013.01); *G06T 2207/30252* (2013.01); *G06T 7/0075* (2013.01); *G06T 7/004* (2013.01)
USPC ............ 382/154; 345/419; 345/427; 382/276

(58) Field of Classification Search
USPC .................................. 382/276–308
See application file for complete search history.

(56) References Cited

U.S. PATENT DOCUMENTS

| 5,825,915 | A  | * | 10/1998 | Michimoto et al. | .......... 382/154 |
| 5,963,664 | A  | * | 10/1999 | Kumar et al. | ................. 382/154 |
| 6,005,987 | A  | * | 12/1999 | Nakamura et al. | ............. 382/294 |
| 6,224,212 | B1 | * | 5/2001  | Noda et al. | ..................... 351/206 |
| 6,269,175 | B1 | * | 7/2001  | Hanna et al. | ................... 382/107 |
| 6,370,268 | B2 | * | 4/2002  | Baba et al. | ..................... 382/154 |

(Continued)

FOREIGN PATENT DOCUMENTS

| JP | 2000-293693 | 10/2000 |
| JP | 2001-092968 | 4/2001 |
| JP | 2007-235642 | 9/2007 |

*Primary Examiner* — Chan Park
*Assistant Examiner* — Iman K Kholdebarin
(74) *Attorney, Agent, or Firm* — Volentine & Whitt, PLLC

(57) ABSTRACT

Extracting information corresponding to a three-dimensional object from an image captured by plural imaging apparatuses is implemented with simple configuration and processing. Parallax information representing a parallax amount in the X direction of a pair of images captured by a pair of imaging apparatuses disposed at different horizontal positions is stored in a storage section, and a parallax correction control section reads out a parallax amount corresponding to a Y coordinate value of image data for one line input from a pre-image processing unit from the storage section and outputs a selection signal to selectors such that the output of one image data is delayed by the differential amount. A differential image generation unit calculates an absolute value of the differential of the pair of input image data for each pixel and outputs the result as a differential image for detecting the three-dimensional object.

19 Claims, 18 Drawing Sheets

(56) References Cited

U.S. PATENT DOCUMENTS

| | | | |
|---|---|---|---|
| 6,445,833 B1* | 9/2002 | Murata et al. | 382/285 |
| 6,490,364 B2* | 12/2002 | Hanna et al. | 382/107 |
| 6,512,857 B1* | 1/2003 | Hsu et al. | 382/294 |
| 6,597,818 B2* | 7/2003 | Kumar et al. | 382/294 |
| 6,714,672 B1* | 3/2004 | Berestov et al. | 382/154 |
| 6,829,383 B1* | 12/2004 | Berestov | 382/154 |
| 6,862,364 B1* | 3/2005 | Berestov | 382/132 |
| 6,985,638 B1* | 1/2006 | Aoki | 382/284 |
| 7,046,270 B2* | 5/2006 | Murata et al. | 348/45 |
| 7,161,614 B1* | 1/2007 | Yamashita et al. | 348/42 |
| 7,558,420 B2* | 7/2009 | Era | 382/154 |
| 7,593,597 B2* | 9/2009 | Palum et al. | 382/278 |
| 7,617,022 B1* | 11/2009 | Wood et al. | 701/3 |
| 7,659,921 B2* | 2/2010 | Aoyama | 348/135 |
| 8,144,974 B2* | 3/2012 | Masuda | 382/154 |
| 8,174,563 B2* | 5/2012 | Saito | 348/47 |
| 8,244,027 B2* | 8/2012 | Takahashi | 382/154 |
| 8,417,022 B2* | 4/2013 | Morimitsu | 382/154 |
| 2003/0060679 A1* | 3/2003 | Murata et al. | 600/111 |
| 2003/0190072 A1* | 10/2003 | Adkins et al. | 382/154 |
| 2004/0233280 A1* | 11/2004 | Aoyama | 348/135 |
| 2004/0247175 A1* | 12/2004 | Takano et al. | 382/154 |
| 2005/0129325 A1* | 6/2005 | Wu | 382/254 |
| 2005/0147277 A1* | 7/2005 | Higaki et al. | 382/103 |
| 2006/0221417 A1* | 10/2006 | Fujieda et al. | 358/538 |
| 2007/0185946 A1* | 8/2007 | Basri et al. | 708/200 |
| 2010/0014780 A1* | 1/2010 | Kalayeh | 382/284 |
| 2011/0074775 A1* | 3/2011 | Shibutani et al. | 345/419 |
| 2011/0134213 A1* | 6/2011 | Tsukagoshi | 348/43 |
| 2011/0311130 A1* | 12/2011 | Ichimori | 382/154 |
| 2012/0147205 A1* | 6/2012 | Lelescu et al. | 348/218.1 |
| 2012/0236124 A1* | 9/2012 | Aoki | 348/47 |
| 2013/0156338 A1* | 6/2013 | Yamazaki | 382/264 |
| 2013/0315472 A1* | 11/2013 | Hattori et al. | 382/154 |

* cited by examiner

THREE-DIMENSIONAL OBJECT DETECTION AREA

THREE-DIMENSIONAL OBJECT DETECTION AREA

DIFFERENTIAL PIXEL AREA DISAPPEAR

DIFFERENTIAL PIXEL AREA DISAPPEAR

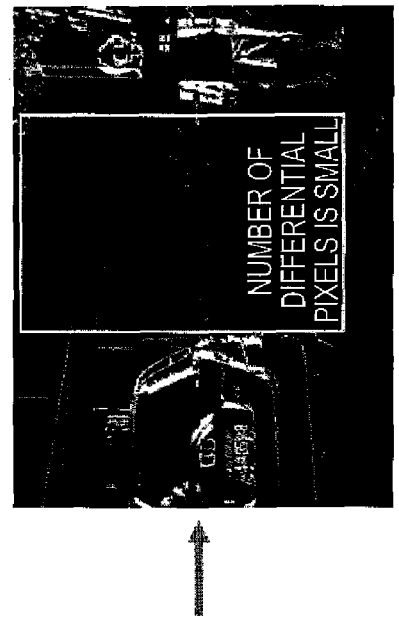
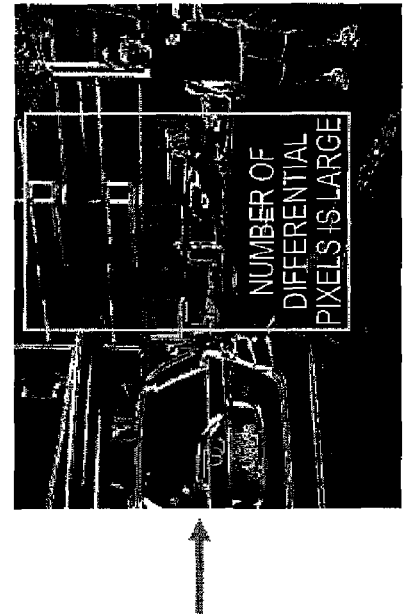
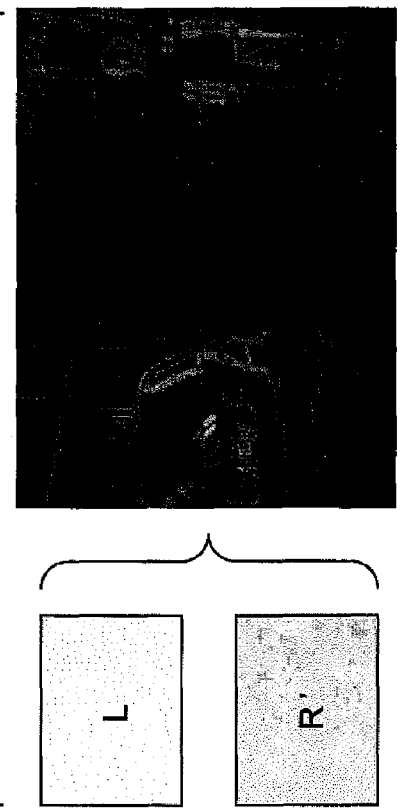
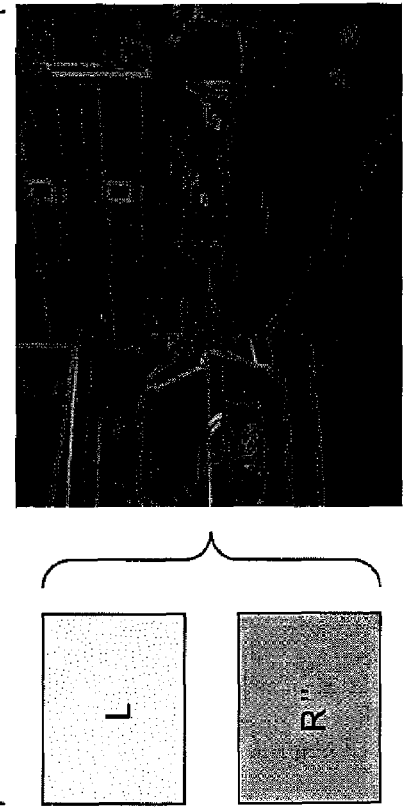

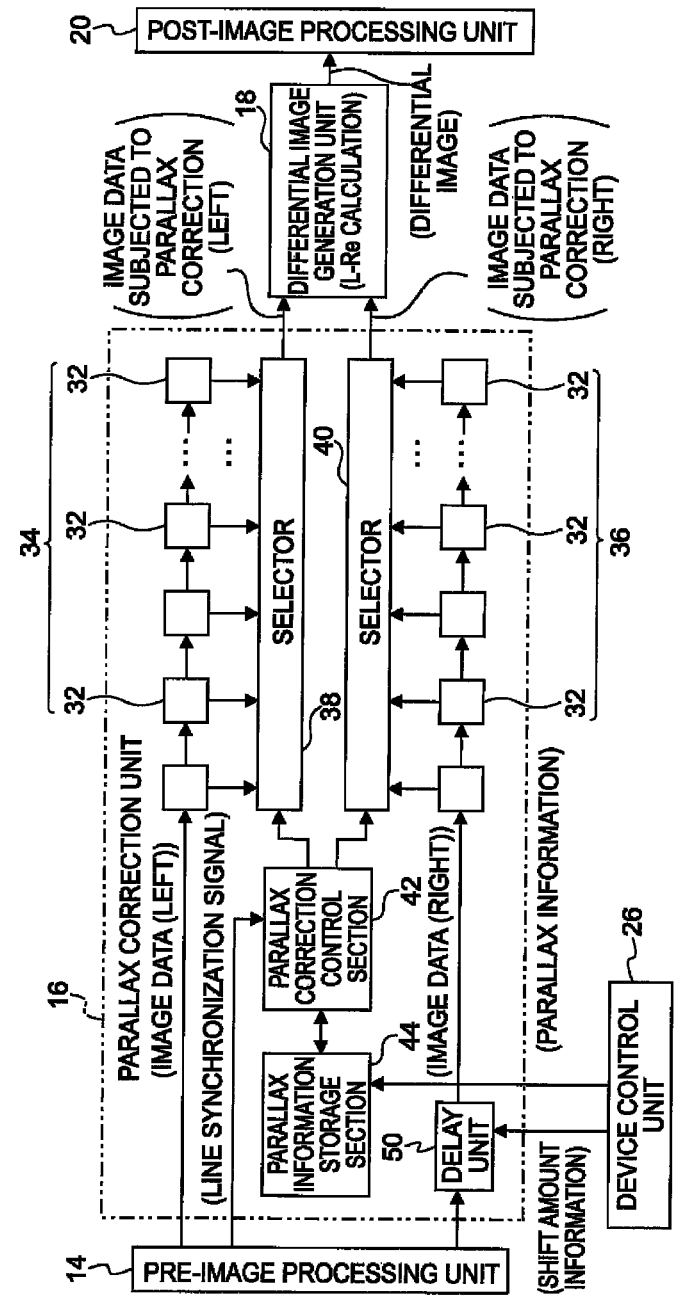

FIG.12A
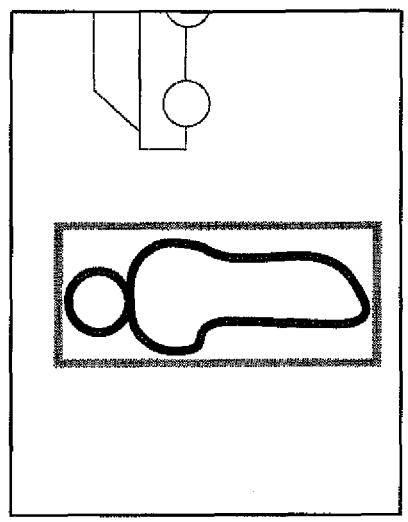
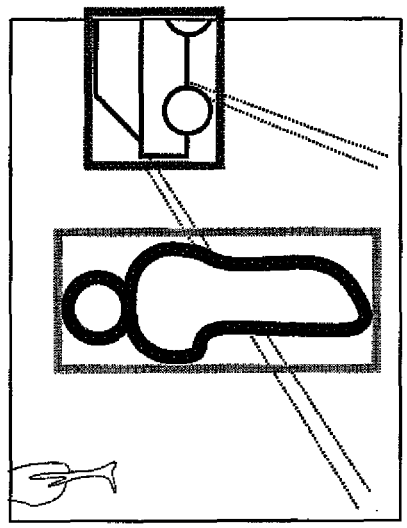
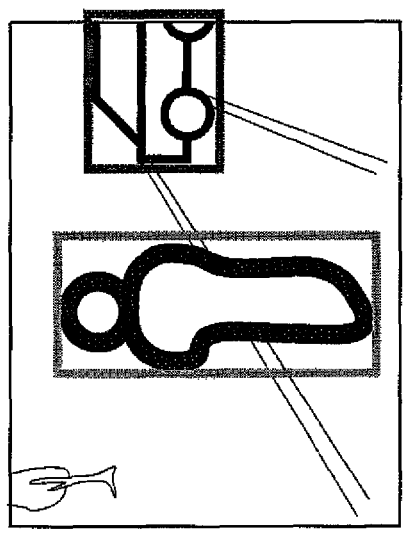

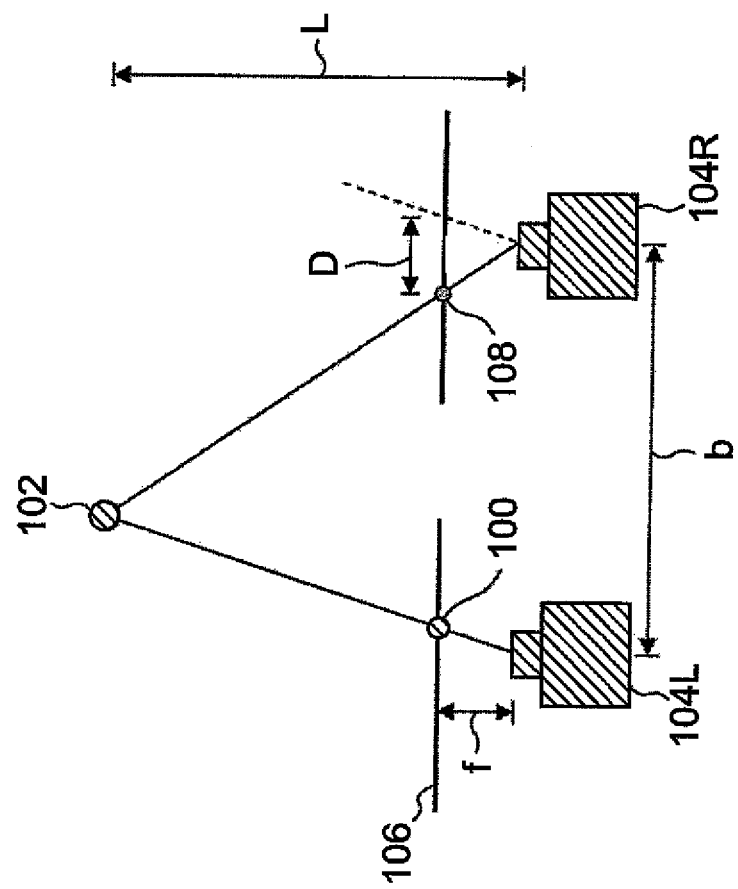

IMAGE PROCESSING APPARATUS, METHOD, PROGRAM, AND RECORDING MEDIUM

TECHNICAL FIELD

The present invention relates to an image processing apparatus, an image processing method, a program, and a recording medium, and particularly to an image processing apparatus which extracts information corresponding to a three-dimensional object from images captured by plural imaging apparatuses, an image processing method applicable to the image processing apparatus, and an image processing program executable by a computer to function as an image processing apparatus, and a recording medium storing the image processing program.

BACKGROUND ART

In recent years, imaging apparatus have improved in performance and decreased in size and cost, and as a result, imaging apparatus (or images captured by imaging apparatus) have been widely used in various fields. As an example thereof, it has become possible to detect the presence or absence, position, distance and the like of a three-dimensional object such as an obstruction from an image obtained by an imaging apparatus mounted on a vehicle that images a space in front of the vehicle and issues a warning as necessary. However, since the imaging apparatus records a three-dimensional space as an image target on a two-dimensional plane, the obtained image lacks three-dimensional information of a three-dimensional object existing in the imaging target space. Therefore, space recognition such as detection of a three-dimensional object from an image is achieved in a manner such that two imaging apparatuses image the same space to produce a pair of images with a difference corresponding to a parallax, the parallax is extracted from the pair of images, and the extracted parallax is made to correspond to spatial information.

In order to extract the parallax from the pair of images with a difference corresponding to the parallax, a block matching method is generally used. According to the block matching method, two images are searched for corresponding points, and the difference in the positions of the corresponding points in the pair of images with a difference corresponding to the parallax corresponds to the parallax.

Specifically, one of the pair of images is defined as a reference image, the other of the pair of the images is defined as a comparison image, and an evaluation area of, for example, about 8×4 pixels is set around a target pixel of the reference image. Further, a similar evaluation area is also set in the comparison image, the difference between a pair of evaluation areas is calculated for each pixel, the degree of matching of the pair of evaluation areas is repeatedly evaluated using an evaluation function ($\Sigma|Li-Ri|$) for integrating an absolute value of the difference or an evaluation function ($\Sigma(Li-Ri)^2$) for integrating a square value of the difference while moving (raster scan) the position of the evaluation area in the comparison image, and the position of the evaluation area with the highest (the value of the evaluation function is the minimum (the smallest)) degree of matching in the comparison image is obtained. This position is a position of the corresponding point on the comparison image with respect to the target pixel of the reference image, and the difference between the position of the target pixel on the reference image and the position of the corresponding point on the comparison image corresponds to the parallax. Further, as illustrated in FIG. 16, a distance L to an object corresponding to a target pixel is calculated by Equation 1 below from parallax D, focal lengths f of two imaging apparatuses 104L and 104R, and a distance (baseline length) b between the two imaging apparatuses 104L and 104R.

Equation 1

$$L = b \times f/D \qquad (1)$$

The above processing is performed for all pixels of the reference image, so that distances to individual objects captured as images can be detected. Note that, in FIG. 16, the reference numeral 106 is an imaging surface and the reference numeral 108 is a corresponding point (a corresponding pixel) on a comparison image.

As a technology using the block matching method, Japanese Patent Application Laid-open (JP-A) No. 2001-92968 discloses a technology in which image data in a reference pixel area in one captured image and image data on a horizontal line corresponding to a vertical position of a reference pixel area in another captured image are stored in a line memory, the image data in the reference pixel area and image data within a set search range are read from the line memory, the correlation destination of the reference pixel area is specified by stereo matching (block matching), and the position of the search range related to the reference pixel area is corrected based on the degree of deviation of a corresponding infinite point using a horizontal position of the reference pixel area as a reference.

JP-A No. 2007-235642 discloses a technology of creating a top view obtained by projectionally transforming a first image (oblique overhead view) including a road surface captured by a camera mounted on a vehicle and a top view obtained by projectionally transforming a second image captured by the same camera at a timing different from that of the first image, matching the two top views against each other by pattern matching based on a characteristic shape (for example, a white line, a boundary line between the road surface and a three-dimensional object, texture of the road surface, a tire nut or the like) on the road surface, and identifying a region having a difference in an overlapping portion of the two top views as an obstruction.

JP-A No. 2000-293693 discloses a technology in which a right image and a left image captured by two TV cameras capturing a road plane are stored, plural lines appearing on the stored right and left images are extracted, corresponding points between the right and left images are calculated based on the extracted plural lines, a parameter of a relational formula established between projecting positions of arbitrary points of the road plane is calculated based on the calculated corresponding points, and a region having a height different from that of the road plane is detected as an obstacle region based on a relational formula determined according to the calculated parameter.

SUMMARY OF INVENTION

Technical Problem

In the above-described block matching, it is necessary to repeat a difference operation, for a single target pixel, a given number of times as high as the number of all the pixels existing in an evaluation area by the number of raster scans, and if this processing is performed for all the pixels in a reference pixel area, the number of operations repeatedly performed becomes enormous and the operation load increases significantly. Since the technology disclosed in JP-A No. 2001-92968 is based on the execution of the block matching, there are problems that a high performance operation apparatus having a high operation frequency is required, the configuration of the apparatus is complicated, manufacturing costs are high, and it is difficult to reduce power consumption.

In the technology disclosed in JP-A No. 2007-235642, since position adjustment of the pair of images is performed by the pattern matching and a constant characteristic shape (for example, a white line) does not always exist on the images as a characteristic shape on the road surface available for the pattern matching, various characteristic shapes available for the pattern matching are sequentially searched for through the images, and the pattern matching is performed using characteristic shapes which may be detected, and therefore, a processing time varies depending on the type of characteristic shapes existing on the images and is significantly increased according to the type thereof. Therefore, the technology disclosed in JP-A No. 2007-235642, for example, is not suitable for a high speed operation such as real-time detection of a three-dimensional object in a captured moving image.

In the technology disclosed in JP-A No. 2000-293693, a corresponding point P' (u', v') on the right image obtained on the assumption that an arbitrary point P (u, v) on the left image exists on the road plane is calculated based on the relational formula established between the projecting positions of the right and left images, and it is determined whether the point P corresponds to an obstacle based on the brightness difference between the point P and the corresponding point P', and for the relational formula, high accuracy with an acceptable error of less than 1 pixel is required. Therefore, the technology disclosed in JP-A No. 2000-293693 is easily influenced by the vibration of a vehicle, the inclination of a road, and the like, and thus it is necessary to frequently calculate a parameter h of relational formula, as also disclosed in JP-A No. 2000-293693, and since it is necessary to calculate 8 unknown parameters by solving 8 simultaneous equations in order to calculate the parameter h of relational formula, the processing load is extremely large. Therefore, in the technology disclosed in JP-A No. 2000-293693, there is a problem that a high speed operation may not be compatible with the maintenance of determination accuracy.

The present invention has been made in view of the above circumstances and provides an image processing apparatus, an image processing method, and an image processing program which implements extracting information corresponding to a three-dimensional object from images captured by plural imaging apparatuses in a short time with a simple configuration and processing.

Solution to Problem

An image processing apparatus according to a first aspect includes a storage unit that stores bias amount information representing a bias amount, which corresponds to a parallax, along a first direction of an image corresponding to a horizontal direction between a first image captured by a first imaging apparatus and a second image captured by a second imaging apparatus which is located at a position different from that of the first imaging apparatus in the horizontal direction, with respect to each position in a second direction of the image corresponding to a vertical direction; an acquisition unit that acquires the first image captured by the first imaging apparatus and the second image captured by the second imaging apparatus; a processing unit that performs a parallax correction with respect to each pixel row along the first direction of the image, the parallax correction moving a position of the image in the first direction of a pixel row along the first direction of the image in accordance with the bias amount represented by the bias amount information corresponding to a position of the pixel row in the second direction of the image; and a generation unit that generates differential information representing a difference between the first image and the second image that have been subjected to the parallax correction by the processing unit.

According to the invention of the first aspect, a first image is captured by a first imaging apparatus and a second image is captured by a second imaging apparatus which is located at a different position in the horizontal direction, and, since the first imaging apparatus and the second imaging apparatus are located at different positions in the horizontal direction, a difference corresponding to parallax occurs between the first image and the second image. In the first aspect of the invention, bias amount information which represents bias amount, which corresponds to parallax, in a first direction on an image corresponding to a horizontal direction of the first image and the second image is stored in a storage unit for each position on an image along a second direction on an image corresponding to a vertical direction. Further, an acquisition unit acquires the first image captured by the first imaging apparatus and the second image captured by the second imaging apparatus, and a processing unit performs a parallax correction, with respect to each pixel row along the first direction of the image, which moves a position on the image along the first direction of a pixel row along the first direction of the image relative to the first image and the second image, according to the bias amount represented by the bias amount information corresponding to a position on the image along the second direction of a pixel row.

Accordingly, in the first aspect of the invention, a difference corresponding to parallax can be corrected by an extremely simple processing which performs a parallax correction, with respect to each pixel row along the first direction of an image, which moves a position on the image along the first direction of a pixel row along the first direction of the image corresponding to the horizontal direction relative to the first image and the second image according to the bias amount information stored in the storage unit with respect to each position on an image along the second direction on an image corresponding to the vertical direction, without performing a complicated processing such as repeating an operation of a degree of matching of evaluation areas set on a pair of images while moving a position of an evaluation area on one image, searching a position of an evaluation area with the highest matching, and specifying corresponding points on a pair of images.

A generation unit generates differential information representing a difference between the first image and the second image which have been subjected to the parallax correction by the processing unit. Since the first image and the second image to be processed by the generation unit have passed through the parallax correction by the processing unit, a difference represented by the differential information generated by the generation unit may be regarded as a difference between the first image and the second image other than a difference corresponding to the parallax, that is, a difference caused by a three-dimensional object existing in the first image and the second image. Thus, the processing performed by the processing unit and the generation unit according to the invention have a low processing load and are simple, which will not cause an increase in a processing time and a complication of an apparatus configuration. Accordingly, according to the first aspect, information corresponding to a three-dimensional object may be extracted from images captured by plural imaging apparatuses using simple configuration and processing.

Note that, in the invention according to the first aspect, there may be a difference caused by factors other than a three-dimensional object, that is, a noise is mixed with the differential information generated by the generation unit by various factors such as a noise superimposed on the first image and the second image, a change in a relative position of the first imaging apparatus and the second imaging apparatus, and/or an accuracy of the bias amount information stored in the storage unit. When the generation unit generates a differential image representing the difference between the first image and the second image for each pixel as the differential information, differential pixels corresponding to differences caused by a three-dimensional object among differential pixels representing that differences exist in the first image and the second image of the generated differential images are often collectively distributed on the differential image and form an area (hereinafter, referred to as a differential area) with a certain area (the number of pixels).

Based on the above, according to a second aspect of the invention, in the first aspect of the invention, the generation unit generates a differential image representing a difference between the first image and the second image for each pixel as the differential information, and the apparatus further include a removal unit that performs a contraction processing with respect to differential pixels (the differential pixels may be a pixel of which difference is more than 0, or a threshold value or more) which exist in the differential image generated by the generation unit and indicate a presence of the difference between the first image and the second image, thereby removing noise from the differential image. In this way, a difference (noise) caused by factors other than a three-dimensional object may be removed from differential information (a differential image) using a simple processing which is the contraction processing.

In the third aspect of the invention, in the first aspect or the second aspect of the invention, the bias amount represented by the bias amount information stored in the storage unit is bias amount D which represents a bias amount by a number of pixels, and the bias amount D is derived in advance by performing operations of Equations 1 to 3 below, where a height of an imaging optical axis from a ground at installation positions of the first imaging apparatus and the second imaging apparatus is defined as h_cam, an inclination angle of the imaging optical axis with respect to a vertical direction is defined as θ, a focal length of an optical system is defined as f, the number of pixels along the first direction of the image is defined as w, the number of pixels along the second direction is defined as h, an imaging size along the first direction of the image is defined as w_img, an imaging size along the second direction is defined as h_img, a position (the number of pixels) on the image along the second direction is defined as P, and a baseline length as a distance of the imaging optical axis of the first imaging apparatus and the second imaging apparatus is defined as b:

Equation 1

$$D = b \times f / L\_cam \times (w/2)/(w\_img/2) \quad (1)$$

wherein L_cam denotes a linear distance between an object which is positioned on the ground and which is imaged at a position (the number of pixels) P on the image along the second direction and the first imaging apparatus or the second imaging apparatus, and L denotes a distance between the object and the first imaging apparatus or the second imaging apparatus:

Equation 2

$$L\_cam = \sqrt{(h\_cam^2 + L^2)} \times \cos(\tan^{-1}(L/h\_cam) - \theta) \quad (2)$$

Equation 3

$$L = \tan(\tan^{-1}((P - (h/2)) \times (h\_img/2)/(h/2)/f) + \theta) \times h\_cam \quad (3).$$

The operations of Equations 1 to 3 above are extremely simple operations, as compared with, for example, an operation which calculate 8 unknown parameters by solving 8 simultaneous equations, which is disclosed in Japanese Patent Application Laid-open (JP-A) No. 2000-293693, and, even when performing a processing of re-operating the bias amount D to update the bias amount information stored in the storage unit, the processing can be completed in an extremely short time.

Further, according to a fourth aspect of the invention, in any one of the first to three aspects of the invention, the bias amount information is information which represents a number of pixels at each position on the image along the first direction, and the processing unit includes a delay unit which delays an output of the first image or an output of the second image in units of pixels, and performs the parallax correction such that the delay unit relatively delays the output of the first image or the output of the second image by the number of pixels represented by the bias amount corresponding to a position on the image along the first direction of a pixel row to be output when the first image and the second image are output to the generation unit in units of pixels in a parallel manner, while switching the number of pixels to be delayed by the delay unit according to a change in the position on the image along the first direction of the pixel row to be output. In this way, the parallax correction may be completed in a short time, as compared with, for example, an aspect in which the parallax correction is performed by relatively moving a storage position in units of pixel rows along the first direction after data of the first image and the second image is stored in a memory and the like.

Further, according to the fifth aspect of the invention, in the fourth aspect of the invention, the delay unit includes a plurality of serially connected delay sections which delay the output of the first image or the output of the second image by one pixel, and the processing unit selects data, which has passed through a number of the delay sections corresponding to the number of pixels represented by the bias amount corresponding to the position on the image along the first direction of the pixel row to be output, as data to be output as the first image or the second image, thereby delaying the data to be output as the first image or the second image by the number of pixels.

Further, according to the sixth aspect of the invention, in one of the first to fifth aspects of the invention, the processing unit excludes a pixel row, a position of which on the image along the first direction is in a range corresponding to an upper side in the vertical direction as compared with a position corresponding to a predetermined horizontal line, from an object to be subjected to the parallax correction.

Further, according to the seventh aspect of the invention, in the first to sixth aspect of the invention, the apparatus further includes a correction unit that corrects at least one of a difference in imaging ranges along the horizontal direction of the first imaging apparatus and the second imaging apparatus, a difference in imaging magnifications, a difference in rotation angles around an imaging optical axis, or a difference in intensities, with respect to the first image and the second image acquired by the acquisition unit, wherein the processing unit performs the parallax correction with respect to the first image and the second image corrected by the correction unit. In this way, as the differential information, information is obtained, from which a difference caused by at least one of the difference in the imaging ranges along the horizontal direction of the first imaging apparatus and the second imaging apparatus, the difference in the imaging magnifications, the difference in the rotation angles around the imaging optical axis, and the difference in the intensity is removed. Note that, it may be configured such that the difference in the imaging ranges along the horizontal direction of the first imaging apparatus and the second imaging apparatus is simultaneously corrected when the processing unit performs the parallax correction, instead of the correction by the correction unit.

Further, according to an eighth aspect, in any one of the first to seventh aspects, the apparatus further includes a three-dimensional object detection unit that detects a three-dimensional object which exists in imaging ranges of the first imaging apparatus and the second imaging apparatus based on the differential information generated by the generation unit. As described above, since the differential information generated by the generation unit is information (information representing a difference caused by the three-dimensional object) corresponds to the three-dimensional object, the three-dimensional object is detected using the differential information, and whereby at least a presence or absence of the three-dimensional object in the imaging ranges of the first imaging apparatus and the second imaging apparatus can be detected using a simple process.

Further, according to a ninth aspect of the invention, in the eighth aspect of the invention, the apparatus further includes an output unit that outputs a detection result of the three-dimensional object by the three-dimensional object detection unit. The detection result by the output unit may be displayed on a display unit using characters, images, diagrams and the like which indicate the detection result of the three-dimensional object, or the detection result by the output unit may be output using sound.

Further, when the generation unit generates the differential image representing the difference between the first image and the second image for each pixel as the differential information, as described above, the differential pixels representing the difference caused by the three-dimensional object are collectively distributed on the differential image to form the differential area with a certain dimension (the number of pixels). For this reason, according to a tenth aspect of the invention, in the eighth or ninth aspect, the generation unit generates a differential image which represents the difference between the first image and the second image for each pixel as the differential information, and the three-dimensional object detection unit extracts an image area corresponding to the three-dimensional object from the differential image based on a distribution on the differential image of differential pixels which exist in the differential image generated by the generation unit and which indicate a presence of the difference between the first image and the second image, thereby detecting a position on an image of the image area corresponding to the three-dimensional object. In this way, the position (in more detail, the position on the image of the image areas corresponding to the three-dimensional object) of the three-dimensional object can be detected using a simple processing.

Furthermore, when the generation unit generates the differential image representing the difference between the first image and the second image for each pixel as the differential information, as described above, the differential pixels representing the difference caused by the three-dimensional object are collectively distributed on the differential image to form the differential area with a certain area (the number of pixels), however, the differential area is often a linear area along edges of the three-dimensional object, and a width of the linear differential area is changed according to a distance between the imaging apparatuses and the three-dimensional object and the width is reduced as the distance between the imaging apparatuses and the three-dimensional object is increased. In this regard, according to the eleventh aspect, in the eighth or ninth aspect of the invention, the generation unit generates a differential image which represents the difference between the first image and the second image for each pixel as the differential information, and the three-dimensional object detection unit extracts an image area corresponding to the three-dimensional object from the differential image generated by the generation unit, and detects a distance to the three-dimensional object corresponding to the image area based on a width of a linear differential area which includes differential pixels which exist hi the extracted image area and which indicate a presence of the difference between the first image and the second image. In this way, the distance to the three-dimensional object corresponding to each image area can be detected using a simple processing.

Further, according to a twelfth aspect of the invention, in one of the eighth, ninth, eleventh aspects of the invention, the generation unit generates a differential image which represents the difference between the first image and the second image for each pixel as the differential information, and the three-dimensional object detection unit extracts an image area corresponding to the three-dimensional object from the differential image generated by the generation unit, repeats a contraction processing with respect to differential pixels which exist in the differential image and which represent a presence of the difference between the first image and the second image while determining whether a linear differential area, which includes the differential pixels existing in the extracted image area, has disappeared, and detects a distance to the three-dimensional object corresponding to the image area based on a number of executions of the contraction processing at a time point at which the linear differential area has disappeared from the image area.

Further, according to a thirteenth aspect, in the ninth aspect of the invention, the generation unit generates a differential image which represents the difference between the first image and the second image for each pixel as the differential information, the three-dimensional object detection unit performs a contraction processing with respect to differential pixels which exist in the differential image and indicate a presence of the difference between the first image and the second image a plurality of times and determines whether a linear differential area which includes the differential pixels has disappeared from the differential image, and the output unit outputs a three-dimensional object detection signal or switches a type of the three-dimensional object detection signal to be output according to whether a number of executions of the contraction processing is less than a threshold value at a time point at which the linear differential area has disappeared from the differential image, or whether the linear differential area has disappeared from the differential image at a time point at which the contraction processing has been performed a predetermined number of times. In this way, instead of detecting the distance to respective three-dimensional objects captured as images in the eleventh or twelfth aspect, in the thirteenth aspect is preferable to a case in which the distance range (the approximate distance) to the three-dimensional object, which is nearest the imaging apparatus, among the respective three-dimensional objects captured as the images is detected, the distance range (the approximate distance) to the three-dimensional object, which is nearest the imaging apparatus, among the respective three-dimensional objects captured as the images can be detected using a simple processing and can be notified by the output or not of the three-dimensional object detection signal or the type of the three-dimensional object detection signal to be output.

Further, an amount of a difference (noise) caused by factors other than a three-dimensional object, which is mixed with the differential information generated by the generation unit, is changed according to such as a change in a relative position of the first imaging apparatus and the second imaging apparatus and/or a change in an accuracy of the correction processing by the correction unit according to the seventh aspect. In this regard, according to a fourteenth aspect of the invention, in one of the first to thirteenth aspects of the invention, the generation unit generates a differential image which represents the difference between the first image and the second image for each pixel as the differential information, and the image processing apparatus further includes a pixel number counting unit that counts the number of differential pixels which exist in the differential image generated by the generation unit and which indicate a presence of the difference between the first image and the second image, and outputs a counting result. Accordingly, when adjusting such as the relative position of the first imaging apparatus and the second imaging apparatus and/or parameters of the correction processing by the correction unit, a counting result of the number of differential pixels is confirmed whenever the adjustment is performed and the number of differential pixels is adjusted to be the minimum, and thus, the relative position of the first imaging apparatus and the second imaging apparatus and/or the parameters of the correction processing by the correction unit can be easily optimized.

Further, according to a fifteenth aspect of the invention, in the fourteenth aspect of the invention, the pixel number counting unit counts a number of the differential pixels which exist in the area designated from the differential image. In this way, the relative position of the first imaging apparatus and the second imaging apparatus and/or the parameters of the correction processing by the correction unit can be adjusted with respect to an arbitrary area (an evaluation area) of the differential image.

However, when the generation unit generates a differential image as differential information, a differential component caused by a three-dimensional object is depicted by a line corresponding to an outline of the three-dimensional object on the differential image. However, for example, if the intensity difference between the three-dimensional object and the background area in the first and second images respectively captured by the first and second imaging apparatuses decreases due to the comparatively low illuminance of an illumination lamp at the time of capturing an image of a subject, when the generation unit generates a differential image from the first and second images subjected to the geometric parallax correction using the process unit, there is a problem that the differential component caused by the three-dimensional object is not clearly shown on the differential image, for example, a part of the line corresponding to the differential component caused by the three-dimensional object is buried by noise so as not to be discontinuous on the differential image.

In consideration of the above-described problem, a sixteenth aspect of the invention, in any one of the first to fifteenth aspects of the invention, it is configured such that the generation unit generates a differential image which represents a differential between the first image and the second image subjected to the parallax correction using the processing unit for each pixel, and the differential image generated by the generation unit is formed as a differential image which represents a differential between the first image and the second image in a state in which a geometric parallax is corrected by the parallax correction using the processing unit and the images are relatively shifted in the first direction by a predetermined shift amount.

In the sixteenth aspect of the invention, since the differential image generated by the generation unit is formed as the differential image representing the differential between the first image and the second image in a state in which the geometric parallax of the images is corrected and the images are relatively shifted in the first direction by the predetermined shift amount in the differential image generated by the generation unit, the differential is detected even at a position where the differential is not detected in a state in which the first and second images are not shifted, and therefore, the differential image becomes an image in which the differential between the first image and the second image including the differential component caused by the three-dimensional object is more emphasized in the first direction than the case where the first image and the second image are not shifted. Accordingly, since it can be suppressed that a part of the line corresponding to the differential component caused by the three-dimensional object is buried by a noise and a discontinuous occurs in a part of the line and etc., it is possible to improve the accuracy of extracting the information corresponding to the three-dimensional object.

Note that, a configuration in which the differential image generated by the generation unit becomes the differential image which represents the differential between the first image and the second image in a state in which the geometric parallax of the images is corrected by the processing unit and the images are relatively shifted in the first direction by the predetermined shift amount, can be implemented by, for example, any one of seventeenth to nineteenth aspects to be described below.

That is, according to a seventeenth aspect of the invention, in the sixth aspect of the invention, the bias amount represented by the bias amount information stored in the storage unit is set as a bias amount corresponding to the geometric parallax, and the processing unit relatively shifts the first image and the second image in the first direction by the predetermined shift amount before or after performing the parallax correction on the first image and the second image. With the above-described configuration, the differential image is generated which represents the differential between the first and second images in a state in which the geometric parallax of the images is corrected by the processing unit and the images are relatively shifted in the first direction by the predetermined shift amount.

In the seventeenth aspect of the invention, since the first and second images can be relatively shifted in the first direction by the processing performed on the image data, there is an advantage that the shift amount can be easily changed and set in accordance with the use purpose or the like.

Further, according to an eighteenth aspect of the invention, in the sixteenth aspect of the invention, the bias amount represented by the bias amount information stored in the storage unit is set as a bias amount obtained by adding a bias amount corresponding to the predetermined shift amount to a bias amount corresponding to the geometric parallax, or the bias amount represented by the bias amount information stored in the storage unit is set as the bias amount corresponding to the geometric parallax and a bias amount corresponding to the shift amount is added thereto before the bias amount is used for the parallax correction using the processing unit. Also according to the above-described configuration, the differential image is generated which represent the differential between the first image and the second image in a state in which the geometric parallax of the images is corrected by the parallax correction unit and the images are relatively shifted in the first direction by the predetermined shift amount.

In the eighteenth aspect of the invention, since the bias amount information used for the parallax correction using the processing unit includes the shift amounts of the first and second images, there is an advantage that the parallax correction using the processing unit and the shifting of the first and second images are simultaneously performed and the configuration of the generation unit does not need to be changed.

Further, according to a nineteenth aspect of the invention, in the sixth aspect of the invention, the bias amount represented by the bias amount information stored in the storage unit is set as a bias amount corresponding to the geometric parallax, and directions of the first imaging apparatus and the second imaging apparatus are set such that a distance between imaging optical axes of the first imaging apparatus and the second imaging apparatus becomes larger further away from the first and second imaging apparatuses, and the directions are adjusted such that the first image and the second image are relatively shifted in the first direction by the predetermined shift amount. Also according to the above-described configuration, the differential image is generated which represent the differential between the first image and the second image in a state in which the geometric parallax of the images is corrected by the parallax collection of the processing unit and the images are relatively shifted in the first direction by the predetermined shift amount.

In the nineteenth aspect of the invention, since the first and second images are relatively shifted in the first direction by adjusting the directions of the first and second imaging apparatuses, it is difficult to change and set the shift amount in accordance with the use purpose or the like, but there is an advantage that the configuration of the generation unit does not need to be changed as in the eighteenth aspect of the invention.

Further, a twentieth aspect of the invention, in any one of the sixth to ninth aspects of the invention, the apparatus further includes a contraction processing unit that performs a contraction processing in the second direction for a first number of times and in the first direction for a second number of times which is greater than the first number of times, with respect to a differential pixel indicating the presence of a differential between the first image and the second image which exists in the differential image generated by the generation unit.

As described above, when the differential image generated by the generation unit is formed as the differential image representing the differential between the first and second images in a state in which the geometric parallax of the images is corrected by the parallax collection of the processing unit and the images are relatively shifted in the first direction by the predetermined shift amount, the differential image becomes an image of which the differential between the first and second images including the differential component caused by the three-dimensional object is more emphasized in the first direction than the case where the first and second images are not shifted. To the contrary, in the twentieth aspect of the invention, since the number of times of performing the contraction processing in the first direction is more than the number of times of performing the contraction processing in the second direction, the contraction processing is excessively performed in the second direction where the differential between the first image and the second image is not emphasized, and therefore a degradation in the accuracy of detecting the three-dimensional object can be suppressed. Further, the contraction processing using the contraction processing unit may be applied to remove noise or detect a distance from the three-dimensional object as in the second, twelfth, and thirteenth aspects of the invention.

Further, according to a twenty first aspect of the invention, in any one of sixteenth to nineteenth aspects, in which the shift amount is set to one half or less of a maximum value of a bias amount corresponding to the geometric parallax.

Further, according to a twenty second aspect of the invention, in the first aspect, directions of the first imaging apparatus and the second imaging apparatus are set such that a distance between imaging optical axes of the first imaging apparatus and the second imaging apparatus becomes larger further away from the first and second imaging apparatuses. Accordingly, a degradation in the accuracy of detecting the three-dimensional object can be suppressed as the ninth aspect without changing the configuration of the generating unit.

An image processing method according to a twenty third aspect includes a storage unit storing bias amount information representing a bias amount, which corresponds to a parallax, along a first direction of an image corresponding to a horizontal direction between a first image captured by a first imaging apparatus and a second image captured by a second imaging apparatus which is located at a position different from that of the first imaging apparatus in the horizontal direction, with respect to each position in a second direction of the image corresponding to a vertical direction; an acquisition unit acquiring the first image captured by the first imaging apparatus and the second image captured by the second imaging apparatus; a processing unit performing a parallax correction with respect to each pixel row along the first direction of the image, the parallax correction moving a position of the image in the first direction of a pixel row along the first direction of the image in accordance with the bias amount represented by the bias amount information corresponding to a position of the pixel row in the second direction of the image; and a generating unit generating differential information representing a difference between the first image and the second image that have been subjected to the parallax correction by the processing unit. In this way, similarly to the first aspect, information corresponding to a three-dimensional object can be extracted from images captured by plural imaging apparatuses using simple configuration and processing.

An image processing program according to a twenty fourth aspect executable by a computer connected to a storage unit, which stores a bias amount information representing bias amount, which corresponds to a parallax, along a first direction of an image corresponding to a horizontal direction between a first image captured by a first imaging apparatus and a second image captured by a second imaging apparatus which is located at a position different from that of the first imaging apparatus in the horizontal direction, with respect to each position in a second direction of the image corresponding to a vertical direction, to function as: an acquisition unit acquiring the first image captured by the first imaging apparatus and the second image captured by the second imaging apparatus; a processing unit performing a parallax correction with respect to each pixel row along the first direction of the image, the parallax correction moving a position of the image in the first direction of a pixel row along the first direction of the image in accordance with the bias amount represented by the bias amount information corresponding to a position of the pixel row in the second direction of the image; and a generating unit generating differential information representing a difference between the first image and the second image that have been subjected to the parallax correction by the processing unit.

Since the image processing program according to the twenty fourth aspect causes the computer connected to the storage unit to serve as the acquisition unit, the processing unit and the generation unit, the computer executes the image processing program according to the twenty fourth aspect to serve as the image processing apparatus according to the first aspect, and thus, similarly to the first aspect, information corresponding to a three-dimensional object can be extracted from images captured by plural imaging apparatuses using simple configuration and processing.

A recording medium according to a twenty fifth aspect, storing a program executable by a computer connected to a storage unit, which stores bias amount information representing a bias amount, which corresponds to a parallax, along a first direction of an image corresponding to a horizontal direction between a first image captured by a first imaging apparatus and a second image captured by a second imaging apparatus which is located at a position different from that of the first imaging apparatus in the horizontal direction, with respect to each position in a second direction of the image corresponding to a vertical direction, to function as: an acquisition unit acquiring the first image captured by the first imaging apparatus and the second image captured by the second imaging apparatus; a processing unit performing a parallax correction with respect to each pixel row along the first direction of the image, the parallax correction moving a position of the image in the first direction of a pixel row along the first direction of the image in accordance with the bias amount represented by the bias amount information corresponding to a position of the pixel row in the second direction of the image; and a generating unit generating differential information representing a difference between the first image and the second image that have been subjected to the parallax correction by the processing unit.

Since the image processing program stored in the recording medium according to the twenty fifth aspect causes the computer connected to the storage unit to serve as the acquisition unit, the processing unit and the generation unit, the computer reads and executes the image processing program stored in the recording medium according to the twenty fifth aspect to serve as the image processing apparatus according to the first aspect, and thus, similarly to the first aspect, information corresponding to a three-dimensional object can be extracted from images captured by plural imaging apparatuses using simple configuration and processing.

Advantageous Effects of Invention

According to the invention as described above, bias amount information representing a bias amount, which corresponds to a parallax, along a first direction of an image corresponding to a horizontal direction between a first image captured by a first imaging apparatus and a second image captured by a second imaging apparatus which is located at a position different from that of the first imaging apparatus in the horizontal direction, with respect to each position in a second direction of the image corresponding to a vertical direction is stored, the first image and the second image are obtained, a parallax correction with respect to each pixel row along the first direction of the image, the parallax correction moving a position of the image in the first direction of a pixel row along the first direction of the image in accordance with the bias amount represented by the bias amount information corresponding to a position of the pixel row in the second direction of the image is performed, differential information representing a difference between the first image and the second image that have been subjected to the parallax correction is generated, and accordingly, information corresponding to a three-dimensional object can be extracted from images captured by plural imaging apparatuses using simple configuration and processing.

BRIEF DESCRIPTION OF DRAWINGS

FIG. 8A is an image diagram explaining an evaluation of a calibration operation using differential images;

FIG. 8B is an image diagram explaining an evaluation of a calibration operation using differential images;

FIG. 8C is an image diagram explaining an evaluation of a calibration operation using differential images;

FIG. 8D is an image diagram explaining an evaluation of a calibration operation using differential images;

FIG. 10 is a schematic configuration diagram illustrating an example of a differential image generation unit described in a second embodiment.

FIG. 12A is an image diagram illustrating an example of a transition of a processing result when a repetitive contraction processing is performed without performing image shifting.

FIG. 16 is a schematic diagram illustrating a method of calculating a distance from an object on the basis of parallax.

DESCRIPTION OF EMBODIMENTS

Hereinafter, an example of an exemplary embodiment of the invention will be described in detail with reference to the accompanying drawings.

First Embodiment

Figure 1:
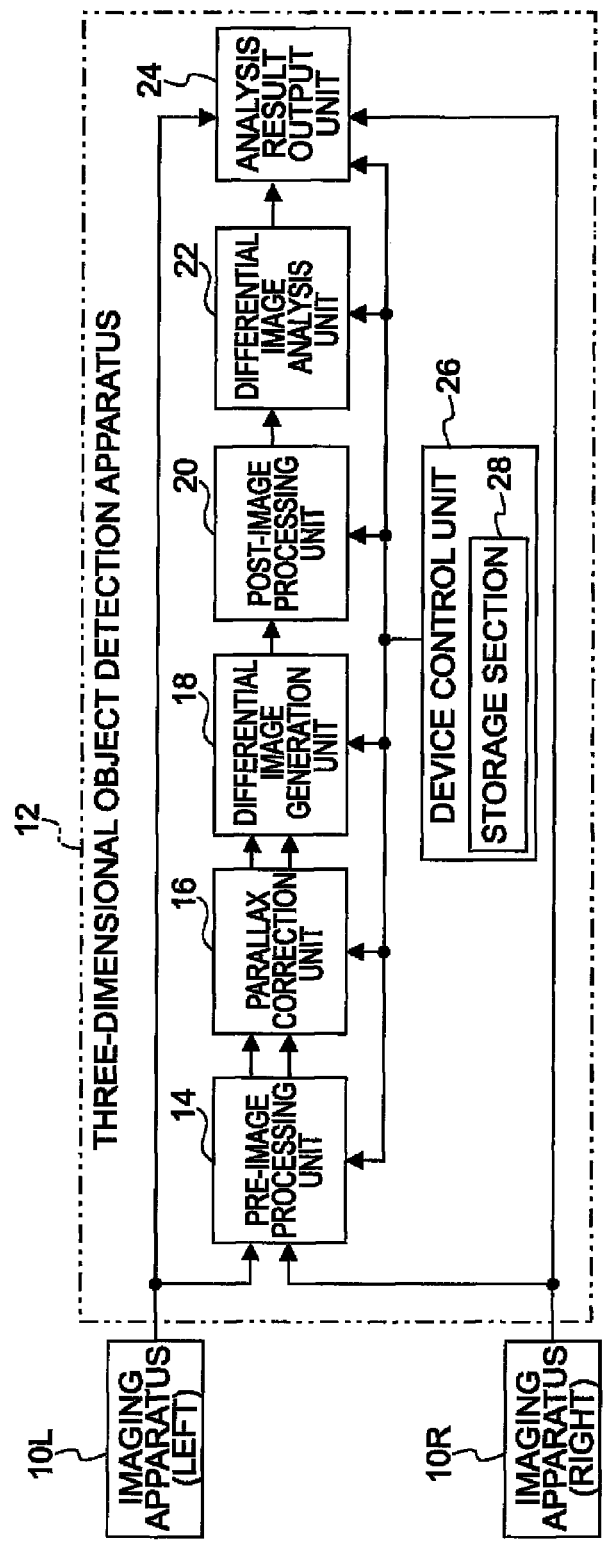
FIG. 1 is a block diagram schematically illustrating the configuration of a three-dimensional object detection apparatus.

FIG. 1 illustrates imaging apparatuses 10L and 10R, and a three-dimensional object detection apparatus 12 connected to the imaging apparatuses 10L and 10R to detect three-dimensional objects from images captured by the imaging apparatuses 10L and 10R.

The imaging apparatuses 10L and 10R are imaging apparatuses of which optical properties are adjusted to match each other in a manner of being capable of capturing a moving image, and they are installed at places and in the directions where they can capture a three-dimensional object as a detection target of the three-dimensional object detection apparatus 12. Detailed installation places of the imaging apparatuses 10L and 10R are determined according to the use of the three-dimensional object detection apparatus 12, for example, when the three-dimensional object detection apparatus 12 is used to detect a three-dimensional object (an obstruction) existing in a space in front of a vehicle, the imaging apparatuses 10L and 10R are installed at places of the vehicle and in the directions in which they can capture the space in front of the vehicle.

After the imaging apparatuses 10L and 10R are installed at predetermined places, the relative positions and directions of the imaging apparatuses 10L and 10R are adjusted in a manner such that heights (heights h_cam of imaging optical axes from the ground in installation positions) of the imaging apparatuses 10L and 10R from the ground are equal to each other (a linear line connecting the imaging apparatuses 10L and 10R to each other is parallel to the ground) and the respective imaging optical axes are parallel to each other at a predetermined interval (a baseline length b: for example, about 7 cm similarly to a distance between both eyes of a person), and a calibration operation is performed to roughly correct the skew of the imaging optical axes and/or a difference of magnification. The imaging apparatuses 10L and 10R having done the calibration operation synchronously operate, and sequentially output image data (moving image data) obtained by an imaging operation, to the three-dimensional object detection apparatus 12.

Preferably, the imaging apparatuses 10L and 10R are integrally connected to each other such that no deviation and the like of the relative positions occur over time. A stereo camera on sale (for example, FinePix 3D and the like, manufactured by Fujifilm Corporation) may be used as the imaging apparatuses 10L and 10R. The imaging apparatuses 10L and 10R are examples of first and second imaging apparatuses.

The three-dimensional object detection apparatus 12 includes a pre-image processing unit 14, a parallax correction unit 16, a differential image generation unit 18, a post-image processing unit 20, a differential image analysis unit 22, and an analysis result output unit 24, which are sequentially connected to one another. In addition, the parallax correction unit 16 is an example of a processing unit according to the invention, the differential image generation unit 18 is an example of a generation unit according to the invention, the post-image processing unit 20 is an example of a removal unit according to a second aspect, the pre-image processing unit 14 is an example of a correction unit according to a seventh aspect, the differential image analysis unit 22 is an example of a three-dimensional object detection unit according to an eighth aspect, the analysis result output unit 24 is an example of an output unit according to a ninth aspect, and signal lines for connecting the imaging apparatuses 10L and 10R to the three-dimensional object detection apparatus 12 are an example of an acquisition unit according to the invention.

The three-dimensional object detection apparatus 12 includes a device control unit 26 having a non-volatile storage section 28 therein. The device control unit 26 is connected to the pre-image processing unit 14, the parallax correction unit 16, the differential image generation unit 18, the post-image processing unit 20, the differential image analysis unit 22, and the analysis result output unit 24 to control the operations thereof.

Figure 2:
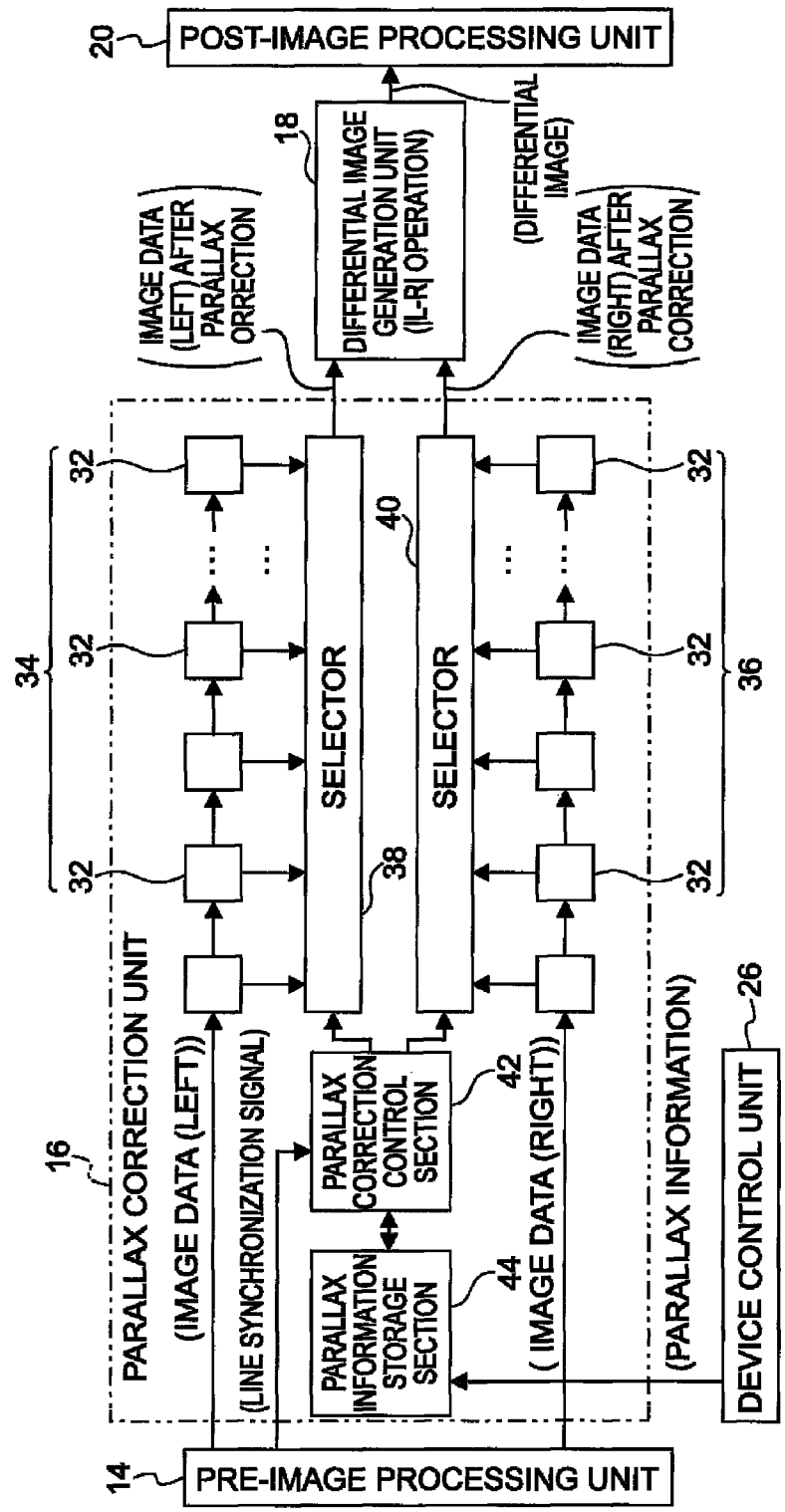
FIG. 2 is a diagram schematically illustrating the configuration of a differential image generation unit.

As illustrated in FIG. 2, image data, which is input from the imaging apparatuses 10L and 10R to the three-dimensional object detection apparatus 12 and has passed through a correction processing (which will be described later) performed by the pre-image processing unit 14, is input from the pre-image processing unit 14 to the parallax correction unit 16 in units of one pixel in a raster scan order. The parallax correction unit 16 includes latch groups 34 and 36 in which plural latches 32 capable of holding data corresponding to one pixel are serially connected to one another. The latch group 34 receives image data which is input from the imaging apparatus 10L and the latch group 36 receives image data which is input from the imaging apparatus 10R. Although not shown in the drawing, the following processes are repeated: pixel clocks each are input to the respective latches 32; the held data corresponding to one pixel is output to the latch 32 of a following stage at the timing synchronized with the pixel clock; and new data corresponding to one pixel, which is input from the latch 32 of a prior stage, is held. Note that the latch groups 34 and 36 are an example of a delay unit according to a fourth aspect, and the respective latches 32 are an example of a delay section according to a fifth aspect.

The respective latches 32 of the latch group 34 are connected to a selector 38 and the respective latches 32 of the latch group 36 are connected to a selector 40. Each of the selectors 38 and 40 has a data output terminal connected to the differential image generation unit 18, and a control signal input terminal connected to a parallax correction control section 42. The parallax correction control section 42 is connected to a parallax information storage section 44 and the pre-image processing unit 14. The parallax information storage section 44 is connected to the device control unit 26, and parallax amount information is written into the parallax information storage section 44 by the device control unit 26. Note that the parallax amount information is an example of bias amount information according to the invention, and the parallax information storage section 44, which stores the parallax amount information written by the device control unit 26, is an example of a storage section according to the invention.

The parallax correction control section 42 outputs a selection signal, which selects data to be output from the data input from the respective latches 32 of the latch group 34, to the selector 38 based on the parallax amount information stored in the parallax information storage section 44, and outputs a selection signal, which selects data to be output from the data input from the respective latches 32 of the latch group 36, to the selector 40 based on the parallax amount information, and, the parallax correction control section 42 switches the selection signals, which are output to the selectors 38 and 40, at the timing synchronized with a line synchronization signal which is input from the pre-image processing unit 14.

Next, a processing of each block of the three-dimensional object detection apparatus 12 will be sequentially described as the operation of the present exemplary embodiment. The pre-image processing unit 14 performs, for the image data which is transmitted from the imaging apparatuses 10L and 10R to the three-dimensional object detection apparatus 12, at least one of an offset correction processing of correcting a difference between imaging ranges along the horizontal direction (the right and left direction on an image) of the imaging apparatuses 10L and 10R, a magnification correction processing of correcting a difference between imaging magnifications of the imaging apparatuses 10L and 10R, a skew correction processing of correcting a difference between skews (rotation angles) around the imaging optical axes of the imaging apparatuses 10L and 10R, an intensity correction processing of correcting a difference between the intensity of images captured by the imaging apparatuses 10L and 10R, a distortion correction processing of correcting a difference between the distortion when capturing images using a wide angle lens, and a noise reduction correction processing of reducing a noise.

Figure 3A:
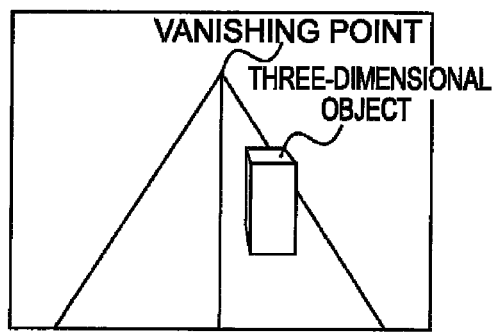
FIG. 3A is an image diagram illustrating an example of an image captured by a monocular imaging apparatus.
Figure 3B:
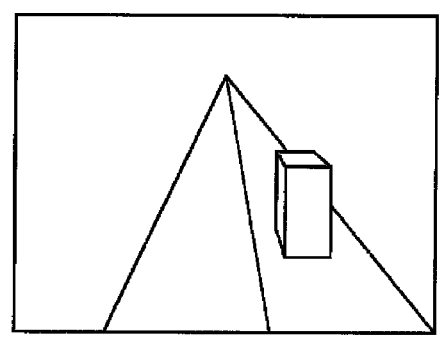
FIG. 3B is an image diagram illustrating an example of an image captured by a right imaging apparatus.
Figure 3C:
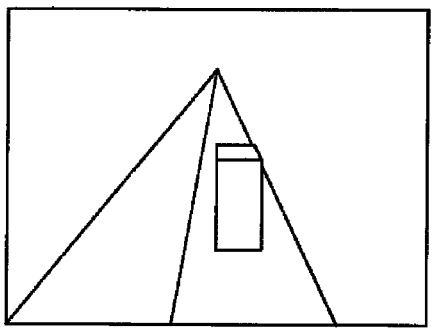
FIG. 3C is an image diagram illustrating an example of an image captured by a left imaging apparatus.

Among the correction processes, the offset correction processing associated with a parallax correction processing of a following stage will be described. On an image captured by an imaging apparatus, parallel lines cross each other at an infinity point (a vanishing point) as illustrated in FIGS. 3A to 3C. Thus, if images captured by the imaging apparatuses 10L and 10R are superimposed, objects positioned at infinity (an upper range in the vertical direction (the Y direction) of an image as compared with a vanishing point) theoretically coincide with each other, however, deviation actually occurs. This is mainly because the imaging optical axes of the imaging apparatuses 10L and 10R are not parallel to each other, and a difference occurs between the imaging ranges along the horizontal direction of the imaging apparatuses 10L and 10R, and the deviation may be obviated through mechanical adjustment by the calibration operation, however, in the offset correction processing of the pre-image processing unit 14, a residual error, which cannot be corrected by the adjustment of the calibration operation, is corrected by shifting one of the images input from the imaging apparatuses 10L and 10R in the right and left direction (the X direction).

Even if the imaging optical axes of the imaging apparatuses 10L and 10R are slightly deviated from the parallel, the imaging ranges in the horizontal direction of the imaging apparatuses 10L and 10R in an infinite distance may appear to coincide with each other seemingly by the offset correction processing, and when the images captured by the imaging apparatuses 10L and 10R have been superimposed, they are corrected to be a geometrically correct image in such a way that objects positioned at infinity (an upper range in the vertical direction (the Y direction) of an image as compared with a vanishing point) coincide with each other with high accuracy and large positional deviation occurs in an object (an object biased downward in the vertical direction of an image) positioned in a short distance from the imaging apparatuses.

The offset correction processing may not be performed by the pre-image processing unit 14, and may be included in the parallax correction processing performed by the parallax correction unit 16 (the two correction processes may be integrally performed). A processing among the above-mentioned correction processing of the correction processing, which is performed by the pre-image processing unit 14, may be selected by the device control unit 26 according to the required accuracy of three-dimensional object detection performed by the three-dimensional object detection apparatus 12.

The parallax correction performed by the parallax correction unit 16 will be described. FIG. 3A illustrates an example of an image captured by a monocular imaging apparatus. FIGS. 3B and 3C illustrate an example of images (images after the offset correction processing is performed by the pre-image processing unit 14) captured by the imaging apparatuses 10L and 10R in the same imaging range according to the exemplary embodiment.

As is apparent from the comparison of the images illustrated in FIGS. 3B and 3C, a difference corresponding to parallax occurs between the image captured by the imaging apparatus 10L and the image captured by the imaging apparatus 10R, and since the difference corresponding to the parallax is caused by a geometric positional relationship (installation positions are distant by the baseline length b) between the imaging apparatuses 10L and 10R, the difference corresponding to the parallax may be eliminated by performing geometric transformation with respect to one of the images (for example, the image captured by the imaging apparatus 10R is transformed into an image that appears to be captured by the imaging apparatus 10L).

Figure 3D:
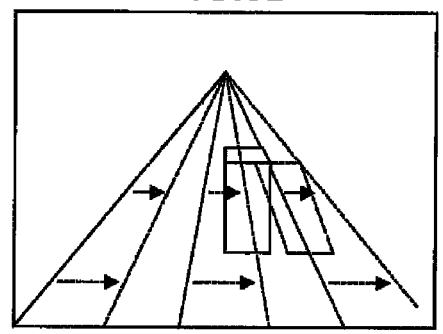
FIG. 3D is an image diagram illustrating an example of a parallax correction with respect to a right image.

For example, for the image shown in FIG. 3C, the transformation (parallax correction) may be performed by adjusting a variation amount (the degree of movement in the horizontal direction of the image) in the X coordinate value of each pixel row extending in the X direction (the horizontal direction) of the image by setting the variation amount to be 0 when the pixel row is present above the vanishing point (the infinity point) in the Y direction and to increase the variation amount in proportion to the distance to the vanishing point when the pixel row is present below the vanishing point in the Y direction as illustrated in FIG. 3D, and the variation amount (length of arrows indicated by broken lines illustrated in FIG. 3D) in the X coordinate value is equal to parallax amount D (bias amount D in the invention).

Figure 4A:
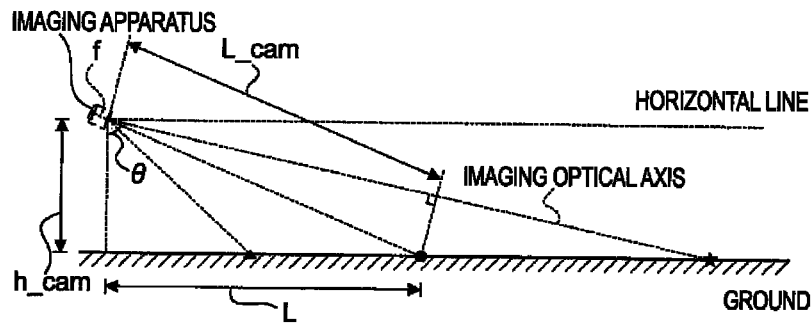
FIG. 4A is an explanation diagram illustrating geometric positional relationships between an imaging apparatus and an imaging object to explain operation equations for calculating parallax amount information.
Figure 4B:
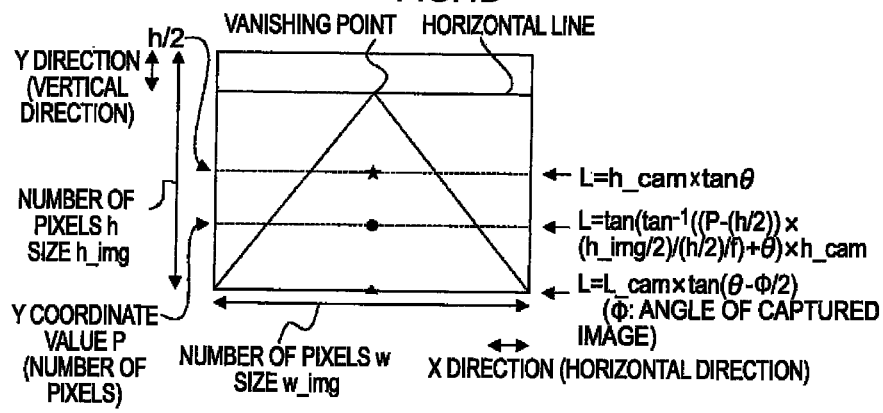
FIG. 4B is an explanation diagram illustrating an example of an image captured by an imaging apparatus to explain operation equations for calculating parallax amount information.

As illustrated in FIGS. 4A and 4B, the parallax amount D at a position (a position indicated by a black circle in FIGS. 4A and 4B) where the Y coordinate value (the number of pixels) of an image is P is calculated by Equation 1 below when the heights of the imaging optical axes from the ground at the installation positions of the imaging apparatuses 10L and 10R are defined as h_cam, inclination angles of the imaging optical axes with respect to the vertical direction are defined as θ, focal lengths of optical systems of the imaging apparatuses 10L and 10R are defined as f, the number of pixels along the X direction of the image is defined as w, the number of pixels along the Y direction is defined as h, an imaging size along the X direction of the image is defined as w_img, an imaging size along the Y direction is defined as h_img, and baseline lengths of the imaging apparatuses 10L and 10R are defined as b.

Equation 1

$$D = b \times f / L\_cam \times (w/2)/(w\_img/2) \qquad (1)$$

In Equation 1 above, L_cam denotes a linear distance from an object which is located on the ground and imaged at a position P on the image in the Y direction to the imaging apparatus 10L or 10R, and is calculated by Equation 2 below.

Equation 2

$$L\_cam = \sqrt{(h\_cam^2 + L^2)} \times \cos(\tan^{-1}(L/h\_cam) - \theta) \qquad (2)$$

In Equation 2 above, since L denotes a distance between the object and the imaging apparatus 10L or 10R and the Y coordinate value on the image of an intersection (a position indicated by an asterisk in FIGS. 4A and 4B) of the imaging optical axes and the ground is "h/2" (refer to FIG. 4B), L is calculated by Equation 3 below.

Equation 3

$$L = \tan(\tan^{-1}((P-(h/2)) \times (h\_img/2)/(h/2)/f) + \theta) \times h\_cam \qquad (3)$$

Figure 4C:
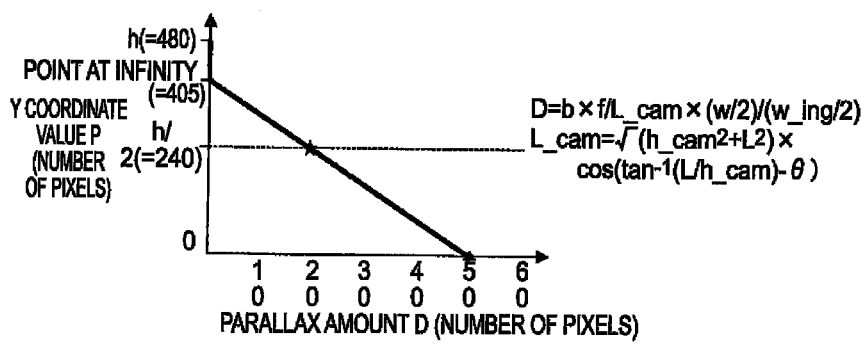
FIG. 4C is a line diagram illustrating an example of relationships between a Y coordinate value on an image and a parallax amount.

As an example, when the heights h_cam of the imaging optical axes from the ground at the installation positions of the imaging apparatuses 10L and 10R are 0.6 m, the inclination angles θ of the imaging optical axes with respect to the vertical direction are 75°, the focal lengths f of the optical systems of the imaging apparatuses 10L and 10R are 35 mm, the number w of pixels along the X direction of the image is 640, the number h of pixels along the Y direction is 480, the imaging size w_img along the X direction of the image is 36 mm, and the imaging size (35 mm photograph film conversion) h_img along the Y direction is 27 mm, a relationship between the Y coordinate value P and the parallax amount D, which is obtained from Equations 1 to 3 above, is illustrated in FIG. 4C. In this example, in a range in which the Y coordinate value P is less than the Y coordinate value 405 of the infinity point (the vanishing point), the parallax amount D is proportional to deviation between the Y coordinate value 405 and the Y coordinate value P of the infinity point (the vanishing point).

The parallax amount information according to the first exemplary embodiment indicates the parallax amount D at each position (in a range less than the Y coordinate value of the vanishing point) along the Y direction of the image. The device control unit 26 performs the operations of Equations 1 to 3 with respect to each position (in a range less than the Y coordinate value of the vanishing point) along the Y direction of the image based on the parameters (h_cam, θ, f, w, h, w_img, h_img and b) stored in advance in the storage section 28, and allows the parallax amount D obtained by the operations to correspond to the Y coordinate value, thereby generating the parallax amount information in advance and writing the generated parallax amount information in the parallax information storage section 44 of the parallax correction unit 16 in advance.

When the image data having passed through the correction processing by the pre-image processing unit 14 is input from the pre-image processing unit 14 in units of pixels in the raster scan order, the parallax correction control section 42 of the parallax correction unit 16 recognizes the Y coordinate value on the image of image data that is input by the pre-image processing unit 14 and corresponds to one line (one pixel row extending in the X direction of the image), and reads the parallax amount D, which has been made to correspond to the recognized Y coordinate value, from the parallax amount information stored in the parallax information storage section 44.

Between the image (hereinafter, referred to as a left image) captured by the imaging apparatus 10L and the image (hereinafter, referred to as a right image) captured by the imaging apparatus 10R, in order for the output of data of an image, in which an image of the same object positioned at a short distance as compared with the infinity point is displaced by the parallax to the upstream side in the raster scan direction, to be relatively delayed by the parallax amount D, the parallax correction control section 42 outputs a selection signal representing that the number of delayed pixels is equal to the read parallax amount D, to one of the selectors 38 and 40, and outputs a selection signal representing that the number of delayed pixels is 0, to the other of the selectors 38 and 40. As is apparent from the comparison of FIGS. 3B and 3C, in the first exemplary embodiment, the image, in which the image of the same object positioned at a short distance as compared with the infinity point is displaced by the parallax to the upstream side in the raster scan direction, is the right image captured by the imaging apparatus 10R, and in the first exemplary embodiment, the selection signal representing that the number of delayed pixels is 0 is output to the selector 38 which outputs image data of the left image, and the selection signal representing that the number of delayed pixels is equal to the read parallax amount D is output to the selector 40 which outputs image data of the right image.

If the number of delayed pixels represented by the input selection signal is 0, the selectors 38 and 40 output the image data, which is output from a latch 32 of the foremost stage, to the differential image generation unit 18. If the number of delayed pixels represented by the input selection signal is 1 or more (=the parallax amount D), the selectors 38 and 40 output the image data, which is output from a $(D+1)^{th}$ latch 32, to the differential image generation unit 18. In this way, the position of an image, which corresponds to one line of image data corresponding to a selector having received the selection signal representing that the number of delayed pixels is equal to the parallax amount D, is relatively moved to the downstream side in the raster scan direction.

In addition, the parallax correction control section 42 recognizes the Y coordinate value, reads the corresponding parallax amount D, and outputs the selection signals to the selectors 38 and 40 whenever the line synchronization signal is input from the pre-image processing unit 14. In this way, the number of delayed pixels (=the parallax amount D), which is input to the selector 40 as a selection signal, is changed according to a change in the Y coordinate value on the image of the image data, which is input from the pre-image processing unit 14 and corresponds to one line, as illustrated in FIG. 4C. As an example, the image illustrated in FIG. 3C is transformed into the image illustrated in FIG. 3E through the parallax correction illustrated in FIG. 3D. This parallax correction may be achieved by performing an extremely simple processing of moving the positions of images of pixel rows along the X direction in the X direction with respect to one of the left image and the right image based on the parallax amount information stored in the parallax information storage section 44 while switching the amount of movement (the number of delayed pixels) according to the Y coordinate values of each pixel row, and thus, processing may be performed on a moving image in real-time, inclusive of processing such as the generation or analysis of a differential image which will be described later, without using a high performance operation apparatus or the like.

As described above, the parallax correction and the offset correction may be simultaneously performed, which may be implemented by configuring such that, as the number of delayed pixels, the parallax correction control section 42 may be configured to apply correction amount obtained by adding offset correction amount to the parallax amount D read from the parallax information storage section 44, or, the device control unit 26 may be configured such that information obtained by uniformly adding the offset correction amount to each parallax amount D set in the parallax amount information is written in the parallax information storage section 44.

Preferably, the parallax amount information is updated according to the installation states of the imaging apparatuses 10L and 10R. Specifically, when the imaging apparatuses 10L and 10R are installed in a vehicle and the like, it is expected that the installation states are changed by vibration and the like. Therefore, it is specifically expected that a parameter such as an inclination angle θ is changed. In order to cope with the change in the parameter, for example, it is preferably configured to provide an element (for example, a gyro sensor) for measuring an inclination, operate and store in advance respective parallax amount information when the inclination measured by the element has each value, and selectively read and use parallax amount information corresponding to the inclination measured by the element (overwritten in the parallax amount information stored in the parallax information storage section 44). In this way, parallax correction according to the inclination measured by the element such as the gyro sensor is performed by the parallax correction unit 16.

The parallax amount D is changed according to optical conditions in the imaging operation by the imaging apparatuses 10L and 10R. For example, when a change has occurred in optical conditions such as the inclination angle θ of the imaging optical axis and/or the height h_cam of the imaging optical axis, the device control unit 26 detects the changed optical conditions, performs the calculation of the parallax amount D and the generation of parallax amount information again based on the detected optical conditions, and records the generated parallax amount information over the existing parallax amount information stored in the parallax information storage section 44. In this way, parallax correction according to the changed optical conditions is performed by the parallax correction unit 16. Even for the calculation of the parallax amount D through Equations 1 to 3, it is extremely simple and the number of calculations is significantly small, as compared with an operation such as a calculation to solve plural simultaneous equations and/or a repetitive operation in block matching, and accordingly, an operation may be completed in a short time without using a high performance operation apparatus.

For example, an operator having changed the optical conditions inputs and sets the changed optical conditions in the device control unit 26, so that the changed optical conditions may be detected by the device control unit 26. However, the invention is not limited thereto. For example, for the inclination angle θ of the imaging optical axis, an angular sensor for detecting the inclination angle θ may be provided, and the inclination angle θ may be detected based on the output of the angular sensor. For various types of optical conditions, the calculation of the parallax amount D and the generation of parallax amount information is performed in advance and the resultant is stored in the storage section 28, and after the optical conditions are changed, the device control unit 26 may read parallax amount information corresponding to the changed optical conditions from the storage section 28 and write the parallax amount information in the parallax information storage section 44.

The generation of a differential image by the differential image generation unit 18 will be described. The differential image generation unit 18 receives image data, of the left image and the right image that have passes through the parallax correction, in units of pixels in a parallel manner. Whenever data corresponding to one pixel of the left image and the right image are input, the differential image generation unit 18 calculates an absolute value |L−R| of the difference between data L corresponding to one pixel of the input left image and data R corresponding to one pixel of the input right image, and obtains the absolute value of the calculated difference as an intensity value of the pixel.

In an image in which a three-dimensional object is an object that is imaged, a large deviation occurs between a position, on the image, of an image part corresponding to the three-dimensional object and a position calculated from the parallax amount D as the image part is directed to an upper portion of the three-dimensional object (the height from the ground is increased). Therefore, if the above-described parallax correction is performed for the image in which the three-dimensional object is imaged, the image part corresponding to the three-dimensional object actually standing upright is in an inclined state on an image having passed through the parallax correction, as is apparent with reference to FIG. 3E illustrating a result obtained by performing the parallax correction with respect to the image illustrated in FIG. 3C.

Figure 3E:
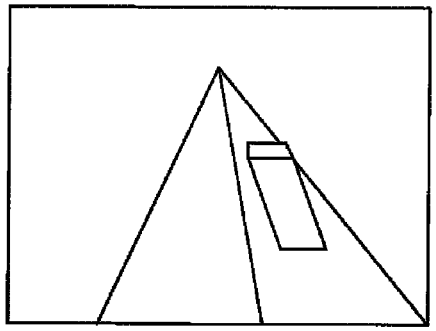
FIG. 3E is an image diagram illustrating an example of a parallax correction result with respect to a left image.
Figure 3F:
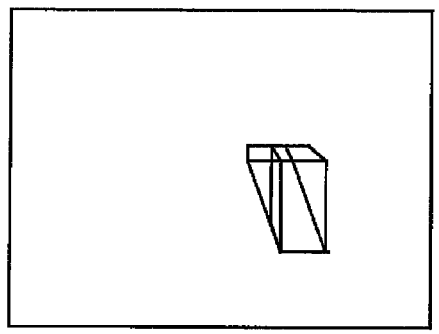
FIG. 3F is an image diagram illustrating an example of a differential image of the right image and the left image.

Thus, for example, when image data of the image illustrated in FIG. 3B is input to the differential image generation unit 18 as image data of the left image, and when image data of the image illustrated in FIG. 3E is input as image data of the right image, as illustrated, for example, in FIG. 3F, pixels corresponding to two-dimensional factors are eliminated as pixels with an intensity of 0, and a differential image having a set (a differential area) of differential pixels with a large differential value (an intensity value) is obtained by pixels (specifically, pixels corresponding to edges of a three-dimensional object) corresponding to a three-dimensional object of the image.

Figure 5A:
FIG. 5A is an image diagram illustrating an example of a captured image (a left image)
Figure 5B:
FIG. 5B is an image diagram illustrating an example of a captured image (a right image)
Figure 5C:
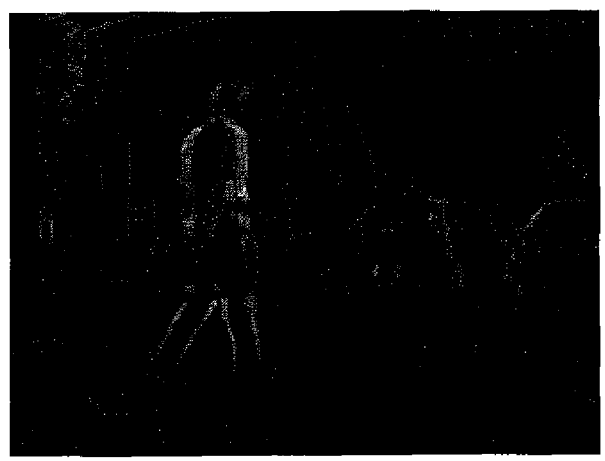
FIG. 5C is an image diagram illustrating an example of a differential image.

FIG. 5C illustrates an example of a differential image generated by the differential image generation unit 18 from the left image illustrated in FIG. 5A and the right image illustrated in FIG. 5B that have passed through the correction processing by the pre-image processing unit 14 and the correction processing by the parallax correction unit 16. A corresponding differential area is present on the differential image illustrated in FIG. 5C by a three-dimensional object such as a person or a vehicle existing on the left image and the right image illustrated in FIGS. 5A and 5B as an object. In principle, parallax increases as the distance between an imaging apparatus and a three-dimensional object becomes closer. In the differential image illustrated in FIG. 5C, the distance between the imaging apparatus and the three-dimensional object is indicated as a width of a corresponding linear differential area (a linear differential area of the person positioned in a short distance from the imaging apparatus has a width wider than that of a linear differential area corresponding to the vehicle). In addition, in the differential image illustrated in FIG. 5C, a differential area corresponding to a background building and/or white lines of a parking lot is an error (noise) caused by positional deviation, a difference in the characteristics and the like of the imaging apparatuses 10L and 10R.

Next, a post-processing by the post-image processing unit 20 will be described. As described above, noise caused by positional deviation, a difference in the characteristics and the like of the imaging apparatuses 10L and 10R is superimposed on the differential image generated by the differential image generation unit 18. For this reason, the post-image processing unit 20 performs a noise removal processing with respect to the differential image which is input from the differential image generation unit 18. As the noise removal processing, a filtering processing by a well-known smoothing filter and the like may be applied. Here, the post-image processing unit 20 performs a contraction processing as the noise removal processing.

Figure 6A:
FIG. 6A is an image diagram illustrating an example of a differential image.
Figure 6B:
FIG. 6B is an image diagram illustrating an example of a result obtained by removing noise from the differential image.

The contraction processing is an image processing in which a minimum value of all pixels in a peripheral area (for example, an area of three pixels×three pixels) employing a target pixel as a center is set as a value of the target pixel. The contraction processing is performed with respect to the differential image once, so that differential pixels isolated in the differential image are removed and pixels on the outermost periphery in a differential area of the differential image are removed by one pixel width. The contraction processing is performed once or more (performed even when noise is mixed, but is preferably repeated several times), so that noise (for example, a differential area corresponding to a background building and/or white lines of a parking lot in the examples of FIGS. 6A and 6B) superimposed on the differential image input from the differential image generation unit 18 is removed, as is apparent from FIG. 6B illustrating the example of a result obtained by performing noise removal by the contraction processing with respect to the differential image illustrated in FIG. 6A.

Geometric parallax is about several to several tens of pixels in principle, but a calibration error is mainly the positional deviation of the imaging apparatuses 10L and 10R. If the positional deviation of the imaging apparatuses 10L and 10R is smaller than parallax amount, the contraction processing is repeated plural times as the noise removal processing, and thus, differential pixels caused by the positional deviation of the imaging apparatuses 10L and 10R are completely removed and a differential area corresponding to a three-dimensional object may remain. Accordingly, since the positional deviation and/or the difference in the characteristics of the imaging apparatuses 10L and 10R are permitted to a certain degree by the noise removal processing, calibration may be simplified and an apparatus cost may be reduced.

The contraction processing in the post-image processing unit 20 may be combined with binarization, the contraction processing may be performed after binarization is performed for the differential image which is input from the differential image generation unit 18, or binarization may be performed after the contraction processing is performed for the differential image if the differential image analysis unit 22 at the following stage is configured to perform a processing with a binarized differential image. Although detailed description thereof will be given later, when the differential image analysis unit 22 performs a processing of detecting a distance range to a three-dimensional object, since the contraction processing is repeated for the differential image, the noise removal processing (the contraction processing) by the post-image processing unit 20 may be omitted.

The analysis of the differential image by the differential image analysis unit 22 and the output of an analysis result by the analysis result output unit 24 will be described. The processing content in the analysis of the differential image by the differential image analysis unit 22 is changed according to the purpose of three-dimensional object detection by the three-dimensional object detection apparatus 12, the type of information to be provided to a user and the like.

For example, for the three-dimensional object detection by the three-dimensional object detection apparatus 12, when it is required that a user is notified of the position of a three-dimensional object (for example, an obstruction and the like) existing in imaging ranges of the imaging apparatuses 10L and 10R, the differential image analysis unit 22 performs a position detection processing of detecting the position and range of an image area corresponding to the three-dimensional object based on the differential image as an analysis processing of the differential image. Note that even when a distance range detection processing (which will be described) is performed by the differential image analysis unit 22, the position detection processing is performed as a pre-processing thereof.

In the position detection processing, after binarization of the differential image is performed, the image area corresponding to the three-dimensional object is extracted by a well-known data analysis method such as a projection method. For example, extraction of the image area corresponding to the three-dimensional object by the projection method may be achieved by the following processing: for the binarized differential image, a histogram of differential pixels in the Y direction is obtained by counting the number of differential pixels of each pixel row along the X direction, a histogram of differential pixels in the X direction is obtained by counting the number of differential pixels of each pixel row along the Y direction, a range of an X coordinate value with a peak of the number of differential pixels in the histogram of the differential pixels in the X direction is extracted as a range of an X coordinate value of the image area corresponding to the three-dimensional object, and a range of a Y coordinate value with a peak of the number of differential pixels in the histogram of the differential pixels in the Y direction is extracted as a range of a Y coordinate value of the image area corresponding to the three-dimensional object. Note that this processing is an example of a processing by a three-dimensional object detection unit according a tenth aspect.

Figure 7A:
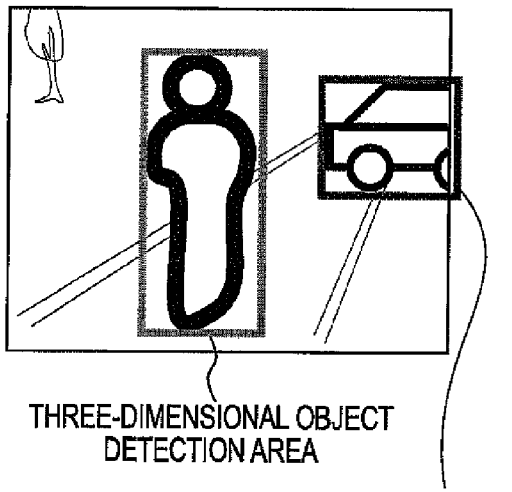
FIG. 7A is an image diagram illustrating an example of a state before a repetitive contraction processing for distance detection is performed.

When the user is notified of the position of the three-dimensional object, the ranges of the X coordinate value and the Y coordinate value of the image area corresponding to the three-dimensional object are output from the differential image analysis unit 22 to the analysis result output unit 24 as an analysis result. As a processing of outputting the analysis result, the analysis result output unit 24 may be configured to perform a processing of generating an image obtained by adding, for example, a frame-like diagram indicating the range of the image area corresponding to the three-dimensional object to the image captured by the imaging apparatus 10L or the imaging apparatus 10R based on the ranges of the X coordinate value and the Y coordinate value of the image area corresponding to the three-dimensional object which are input from the differential image analysis unit 22, as illustrated in FIG. 7A, and causing a display and the like to display the generated image. In this way, the user may be notified of the position of the three-dimensional object existing in the imaging ranges of the imaging apparatuses 10L and 10R.

For the three-dimensional object detection by the three-dimensional object detection apparatus 12, for example, when it is required that the user is notified of an approximate distance (a distance range: for example, any one of large/medium/small of a distance) to each three-dimensional object existing in the imaging ranges of the imaging apparatuses 10L and 10R, the differential image analysis unit 22 performs the position detection processing as a pre-processing, and then performs a repetitive contraction processing of detecting a distance range to a three-dimensional object existing in an image area detected in the position detection processing.

As described before, in the differential image, the width of the linear differential area corresponding to the three-dimensional object is changed according to the distance between the imaging apparatuses and the three-dimensional object, and is increased as the distance between the imaging apparatuses and the three-dimensional object is reduced. In the repetitive contraction processing, whether a differential area in each image area extracted in the position detection processing has disappeared or not is determined using the above fact while the above-described contraction processing is being repeated for the differential image several times (instead of this, whether the number of differential pixels in each image area is a predetermined value or less may be determined).

Figure 7B:
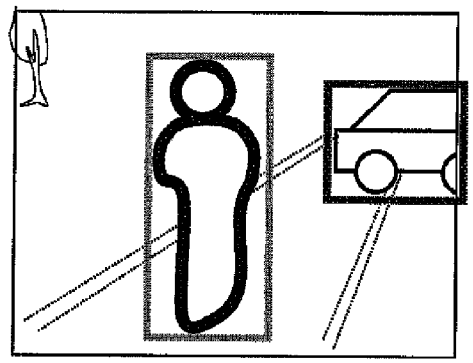
FIG. 7B is an image diagram illustrating an example of a state of the number of the repetitive contraction processing=n1.
Figure 7C:
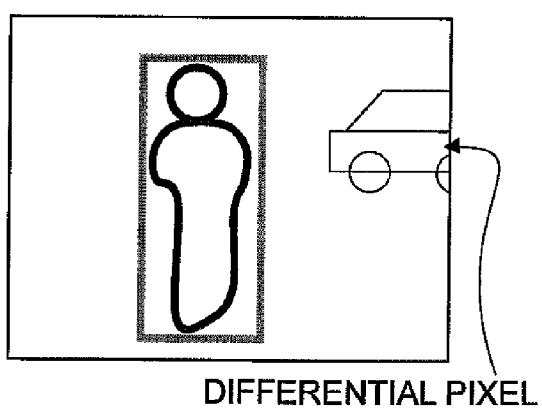
FIG. 7C is an image diagram illustrating an example of a state of the number of the repetitive contraction processing=n2 (>n1)
Figure 7D:
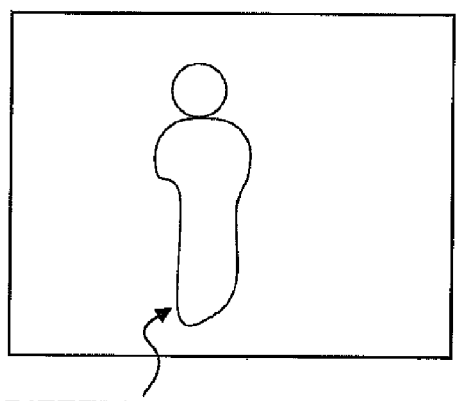
FIG. 7D is an image diagram illustrating an example of a state of the number of the repetitive contraction processing=n3 (n>2)

For example, from the differential image illustrated in FIG. 7A, while an image area corresponding to a person and an image area corresponding to a vehicle are extracted as the image area corresponding to a three-dimensional object, a tree and white lines of the image are also extracted as a differential area by the influence of the positional deviation, the difference in the characteristics and the like of the imaging apparatuses 10L and 10R. When the repetitive contraction processing is performed for the differential image, if the contraction processing is repeated n1 times as illustrated in FIG. 7B, while the widths of the linear differential area corresponding to the person and the linear differential area corresponding to the vehicle are reduced, the differential areas corresponding to the tree and the white lines of the image disappear. In addition, if the contraction processing is repeated n2 (>n1) times as illustrated in FIG. 7C, the differential area corresponding to the vehicle also disappears and only the differential area corresponding to the person remains. Furthermore, if the contraction processing is repeated n3 (>n2) times as illustrated in FIG. 7D, the differential area corresponding to the person also disappears.

From the above result, for example, the differential area disappearing at the time point at which the contraction processing has been repeated n1 times is regarded as noise, a three-dimensional object (the vehicle in the examples of FIGS. 7A to 7D) corresponding to the differential area disappearing at the time point at which the contraction processing has been repeated n2 times is determined that "the distance range to the imaging apparatus is large", and a three-dimensional object (the person in the examples of FIGS. 7A to 7D) corresponding to the differential area disappearing at the time point at which the contraction processing has been repeated n3 times is determined that "the distance range to the imaging apparatus is medium". If a differential area remains even when the contraction processing has been repeated n3 times, a three-dimensional object corresponding to the differential area may be determined that "the distance range to the imaging apparatus is small". Note that this processing is an example of a process by a three-dimensional object detection unit according to eleventh and twelfth aspects.

When the user is notified of the distance range to each three-dimensional object, the ranges of the X coordinate value and the Y coordinate value of the image area corresponding to the three-dimensional object as well as a determination result of distance ranges of each image area corresponding to the three-dimensional object are output from the differential image analysis unit 22 to the analysis result output unit 24 as an analysis result. As a processing of outputting the analysis result, the analysis result output unit 24 may be configured to perform a processing of generating an image obtained by adding a frame diagram indicating the range of the image area corresponding to the three-dimensional object, for example, to the image captured by the imaging apparatus 10L or the imaging apparatus 10R and switching a display color of a frame according to the determination result of the distance ranges, and causing a display and the like to display the generated image. In this way, the user may be notified of the position of the three-dimensional object existing in the imaging ranges of the imaging apparatuses 10L and 10R, and the distance ranges. Note that instead of switching the display color of the frame, the distance ranges may be displayed using characters and the like.

Note that, instead of performing the repetitive contraction processing after performing the position detection processing as described above, the position detection processing may be performed after performing the repetitive contraction processing. In detail, for example, the contraction processing is repeating for the differential image n3 times, the differential images at the time point at which the contraction processing has been repeated n1 times and n2 times are preserved, first, an image area corresponding to a three-dimensional object may be searched for the differential image when the contraction processing has been repeated n3 times, next, an already extracted image area is excluded from an object to be searched, an image area corresponding to the three-dimensional object may be searched for the differential image when the contraction processing has been repeated n2 times, and then, an already extracted image area is excluded from an object to be searched, and an image area corresponding to the three-dimensional object may be searched for the differential image when the contraction processing has been repeated n1 times. In the examples of FIGS. 7A to 7D, the image area corresponding to the person is extracted from the differential image (refer to FIG. 7C) when the contraction processing has been repeated n2 times, and is excluded from an object to be searched in a processing for the differential image (refer to FIG. 7B) when the contraction processing has been repeated n1 times. In this processing, the image area corresponding to the three-dimensional object is searched for a differential image from which a differential area which may be regarded as noise has been removed. In this way, the image area corresponding to the three-dimensional object may be searched with high accuracy and a processing time may be shortened.

For the three-dimensional object detection by the three-dimensional object detection apparatus 12, for example, when it is required that the user is notified of a distance range to a three-dimensional object, which is nearest to the imaging apparatuses 10L and 10R, among three-dimensional objects existing in the imaging ranges of the imaging apparatuses 10L and 10R, the differential image analysis unit 22 performs the above-described repetitive contraction processing without performing the position detection processing as a pre-processing, for example, when all differential areas have disappeared at the time point at which the contraction processing has been repeated n1 times, it may be determined that "no three-dimensional object exist". When all differential areas have disappeared at the time point at which the contraction processing has been repeated n2 times, it may be determined that "a three-dimensional object with a large distance range to the imaging apparatuses exist". When all differential areas have disappeared at the time point at which the contraction processing has been repeated n3 times, it may be determined that "a three-dimensional object with a medium distance range to the imaging apparatuses exist". If a differential area remains even when the contraction processing has been repeated n3 times, it may be determined that "a three-dimensional object with a small distance range to the imaging apparatuses exist". Note that this processing is an example of a processing by a three-dimensional object detection unit according to a thirteenth aspect.

When the user is notified of a distance range to a three-dimensional object which is nearest to the imaging apparatuses 10L and 10R, the determination result is output from the differential image analysis unit 22 to the analysis result output unit 24. As a processing of outputting the analysis result, the analysis result output unit 24 may be configured to output a warning sound only if a three-dimensional object exists, and switch at least one of, for example, volume of the warning sound, an output time interval of the warning sound, and the type (for example, a frequency, a tone and the like) of the warning sound. In this way, the user may be notified of the distance range to the three-dimensional object which is nearest to the imaging apparatuses 10L and 10R. Note that this processing is an example of a processing by an output unit according to the thirteenth aspect.

For the three-dimensional object detection by the three-dimensional object detection apparatus 12, for example, when whether the three-dimensional object exists in the imaging ranges of the imaging apparatuses 10L and 10R and it is required that the user is notified of the presence of a three-dimensional object (for example, an obstruction and the like) if the obstruction and the like is present, the differential image analysis unit 22 may be configured to perform a processing, as an analysis processing of a differential image, of counting the number of differential pixels of the differential image which is input from the post-image processing unit 20 or the number of differential pixels representing a difference with a magnitude which is a predetermined value or more, and perform a processing of determining that "a three-dimensional object exists" when the counting result is a threshold value or more, or perform a processing of integrating differences represented by each differential pixels over all differential pixels, and perform a processing of determining that "a three-dimensional object exists" when the integration result is a threshold value or more. In such a case, when the analysis result by the differential image analysis unit 22 represents "a three-dimensional object exists", the analysis result output unit 24 may be configured to output a warning sound and/or output a sound message such as "an obstruction has been detected", thereby notifying the analysis result using sound.

In the exemplary embodiment, an aspect in which the differential image generated by the differential image generation unit 18 is used to detect a three-dimensional object has been described. However, the invention is not limited thereto. Since the number of differential pixels (noise) mixed with the differential image due to the positional deviation and the like of the imaging apparatuses 10L and 10R is changed according to the amount of the positional deviation of the imaging apparatuses 10L and 10R, the differential image may be used to determine a propriety of a calibration operation (the propriety of the positional relationship between the imaging apparatuses 10L and 10R). FIG. 8A illustrates a differential image generated by combining a left image L with a right image R', FIG. 8C illustrates a differential image generated by combining a left image L with a right image R'', FIG. 8B illustrates a binarized differential image obtained by binarizing the differential image illustrated in FIG. 8A with a predetermined threshold value, and FIG. 8D illustrates a binarized differential image obtained by binarizing the differential image illustrated in FIG. 8C with a predetermined threshold value. The right image R' and the right image R'' have been captured by the imaging apparatus 10R in a state in which the positional relationship relative to the imaging apparatus 10L is different.

The propriety of the positional relationship between the imaging apparatuses 10L and 10R is determined by counting the number of differential pixels of the differential image. The number of differential pixels corresponding to a three-dimensional object of the differential image is less changed according to a change in the positional relationship between the imaging apparatuses 10L and 10R. For this reason, for example, as indicated by white frames illustrated in FIGS. 8B and 8D, it is preferable that a range excluding an image area corresponding to the three-dimensional object of the differential image is designated as an evaluation area by an operator and the number of differential pixels existing in the evaluation area designated by the operator is counted. The optimal positional relationship between the imaging apparatuses 10L and 10R is set such that a minimum number of differential pixels are present in the evaluation area. The operator may perform a processing of counting and outputting the number of differential pixels in the evaluation area whenever adjusting the positional relationship between the imaging apparatuses 10L and 10R in a calibration operation, recognize the optimal positional relationship between the imaging apparatuses 10L and 10R, in which the number of differential pixels in the evaluation area is minimum, based on the degree (an increase or a reduction in the number of differential pixels) and amount of a change in the output number of differential pixels, and perform adjustment to the recognized optimal positional relationship.

Since the number of differential pixels in the evaluation area is also changed according to the propriety of processing conditions of the correction processing by the pre-image processing unit 14, the counting and output of the number of differential pixels in the evaluation area is also available when adjusting the processing conditions of the correction processing by the pre-image processing unit 14 to optimal processing conditions. Each aspect as described above corresponds to fourteenth and fifteenth aspects.

In the exemplary embodiment, an aspect in which the distance range of the three-dimensional object is detected by performing the repetitive contraction processing with respect to the differential image has been described. However, the invention is not limited thereto. As described above, in the differential image, since the width of the linear differential area corresponding to the three-dimensional object is changed according to the distance between the imaging apparatuses and the three-dimensional object and is increased as the distance between the imaging apparatuses and the three-dimensional object is reduced, the width of the linear differential area may be detected (the number of pixels is counted) and the distance range of the three-dimensional object may be determined based on the detected width. The eleventh aspect includes the above aspect.

Second Embodiment

Next, a second embodiment of the invention will be described. Further, the same reference numerals will be given to the same components as those of the first embodiment, and the description thereof will not be repeated.

Figure 9C:
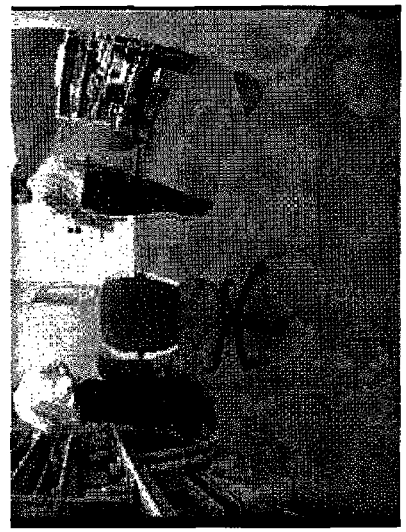
FIG. 9C is an image diagram illustrating an example of a captured image.
Figure 9B:
FIG. 9B is an image diagram illustrating an example of a captured image.
Figure 9A:
FIG. 9A is an image diagram illustrating an example of a captured image.
Figure 9F:
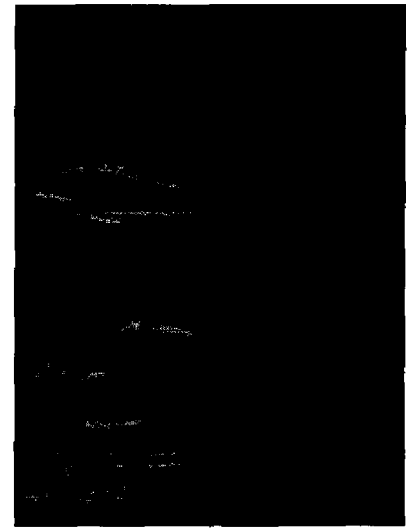
FIG. 9F is an image diagram illustrating an example of a differential image corresponding to the captured image of FIG. 9C.
Figure 9E:
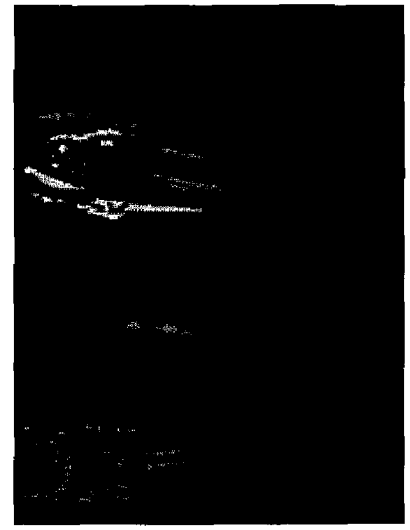
FIG. 9E is an image diagram illustrating an example of a differential image corresponding to the captured image of FIG. 9B.
Figure 9D:
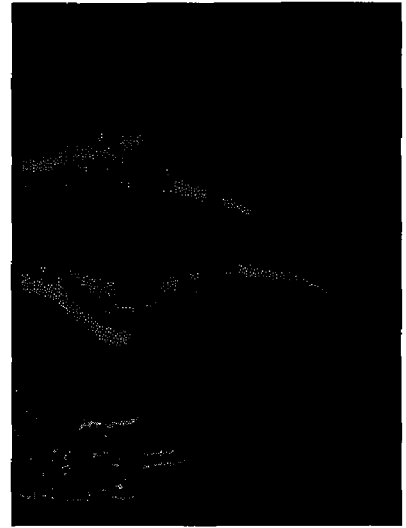
FIG. 9D is an image diagram illustrating an example of a differential image corresponding to the captured image of FIG. 9A.

FIGS. 9A to 9C respectively illustrate examples of one of the left and right images captured by the imaging apparatus 10L and 10R described in the first embodiment, and FIGS. 9D to 9F respectively illustrate examples of a differential image generated by the three-dimensional object detection apparatus 12 described in the first embodiment from the images shown in FIGS. 9A to 9C (a differential image generated by the differential image generation unit 18 through a correction processing using the pre-image processing unit 14 and a parallax correction processing using the parallax correction unit 16).

The images shown in FIGS. 9A to 9C are obtained by capturing an indoor scene, and the contrast of the image decreases due to the low illuminance of an illumination lamp with respect to a subject at the time of capturing the image thereof, and the intensity difference between a three-dimensional object and a background area in the images is small. When a differential image is generated from the images by the three-dimensional object detection apparatus 12 described in the first embodiment, there is a possibility that a differential component caused by the three-dimensional object is not clearly shown on the differential image and a detection failure of the three-dimensional object is generated due to, for example, a reason that a part of an outline corresponding to the differential component caused by the three-dimensional object is buried by noise on the differential image.

For example, in the example of FIG. 9, a first person exists at a position comparatively distant from the imaging apparatuses 10L and 10R within the left area of the images shown in FIGS. 9A to 9C, but the outline corresponding to the first person is not clearly shown on the differential images shown in FIGS. 9D to 9F. For this reason, there is a possibility that the first person may not be detected as a three-dimensional object. Further, a second person exists within a right area of the images shown in FIGS. 9A to 9C, but particularly, in the differential images of FIGS. 9E and 9F respectively corresponding to FIGS. 9B and 9C where the second person exists at a position comparatively distant from the imaging apparatuses 10L and 10R, the outlines corresponding to the second person are discontinuous and etc., and due to the discontinuous outline, there is a possibility that the distance from the second person is erroneously detected or the second person is erroneously detected with plural three-dimensional objects.

Furthermore, as obvious from the above-mentioned Equation 1, the accuracy of detecting the three-dimensional object may be improved since the parallax amount D increases as the baseline length b increases, however, for example, in a case in which the imaging apparatuses 10L and 10R are integrated as a monocular imaging apparatus, an increase in baseline length b leads to an increase in size of the imaging module, and the weight and/or the cost of the entire system increases in order to ensure the strength of the imaging module. Further, there are problems that the installation place for the imaging module is difficult to be ensured, a degree of freedom in the design is degraded and etc.

For this reason, the second embodiment adopts a configuration in which the parallax correction unit 16 performs parallax correction after the left and right images are relatively shifted in the horizontal direction (right and left direction, the X direction) of the image by a predetermined shift amount. That is, as shown in FIG. 10, the parallax correction unit 16 according to the second embodiment has a configuration in which a delay unit 50 is provided at the preceding stage of a latch group 36 which transmits image data of the right image (between the latch group 36 and the pre-image processing unit 14). A pixel clock is input to the delay unit 50, and shift amount information indicating a relative shift amount S between the left and right images as the number of pixels is input thereto from the device control unit 26. Then, the delay unit 50 relatively shifts the left and right images in the horizontal direction (the X direction) of the image by sequentially outputting the image data of the right image, which is sequentially input from the pre-image processing image 14 for every pixel, to the latch group 36 after the image data is delayed by the number of pixels indicated by the shift amount information which is input from the device control unit 26.

Figure 11A:
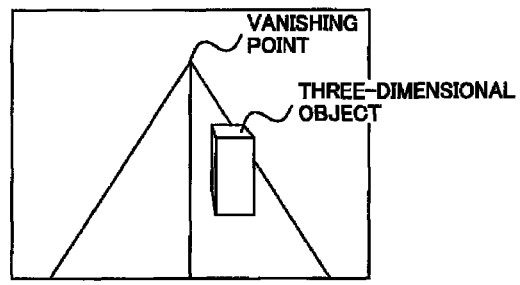
FIG. 11A is an image diagram illustrating an example of an image captured by a monocular imaging apparatus.
Figure 11B:
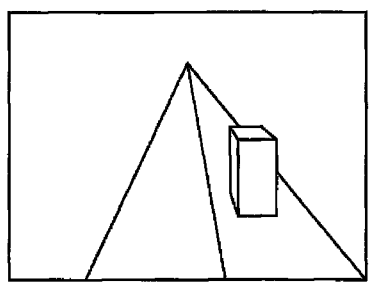
FIG. 11B is an image diagram illustrating an example of an image captured by a left imaging apparatus.
Figure 11C:
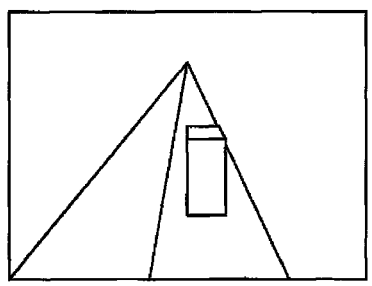
FIG. 11C is an image diagram illustrating an example of an image captured by a right imaging apparatus.
Figure 11D:
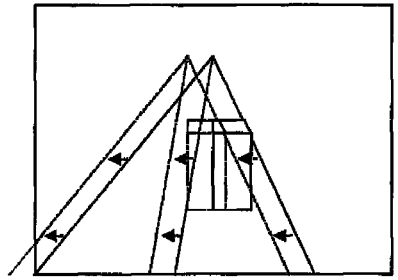
FIG. 11D is an image diagram illustrating an example of shifting with respect to a right image.
Figure 11E:
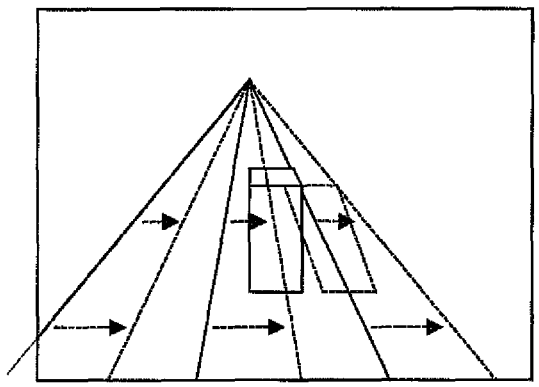
FIG. 11E is an image diagram illustrating an example of parallax correction with respect to a right image after shifting.
Figure 11F:
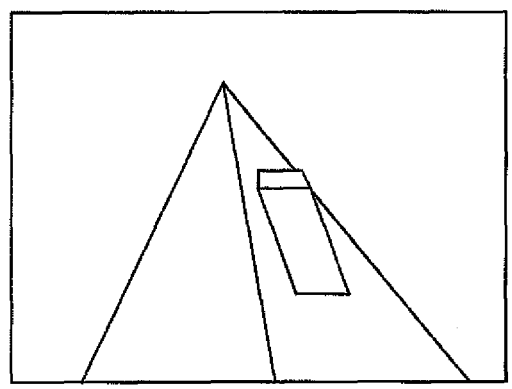
FIG. 11F is an image diagram illustrating an example of a parallax correction result with respect to the right image after shifting.

As an example, the same images as those of FIGS. 3A to 3C are shown in FIGS. 11A to 11C. However, if the processing of delaying the output of the image data using the delay unit 50 of the parallax correction unit 16 is performed on the right image shown in FIG. 11C among the images, the right image shifted in the horizontal direction (the X direction) of the image with respect to the left image shown in FIG. 11B is input to the latch group 36, for example as shown in FIG. 11D. Accordingly, the right image shown in FIG. 11D is converted into the image shown in FIG. 11F through parallax correction shown in FIG. 11E. Then, the differential image generated by the differential image generation unit 18 becomes an image of which geometric parallax is corrected by parallax correction and which indicates a differential between the left and right images while the images are relatively shifted in the first direction by a predetermined shift amount as shown in FIG. 11G as an example, that is, an image of which a differential between the left and right images in the horizontal direction (the X direction) is emphasized than the case of not performing the image shifting by the delay unit 50.

Figure 11G:
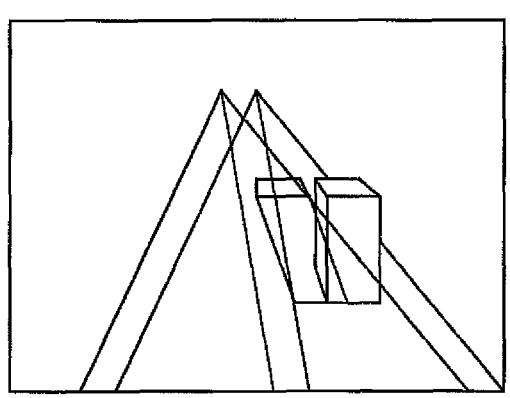
FIG. 11G is an image diagram illustrating an example of a differential image between the left image and the right image after shifting and parallax correction.
Figure 12B:
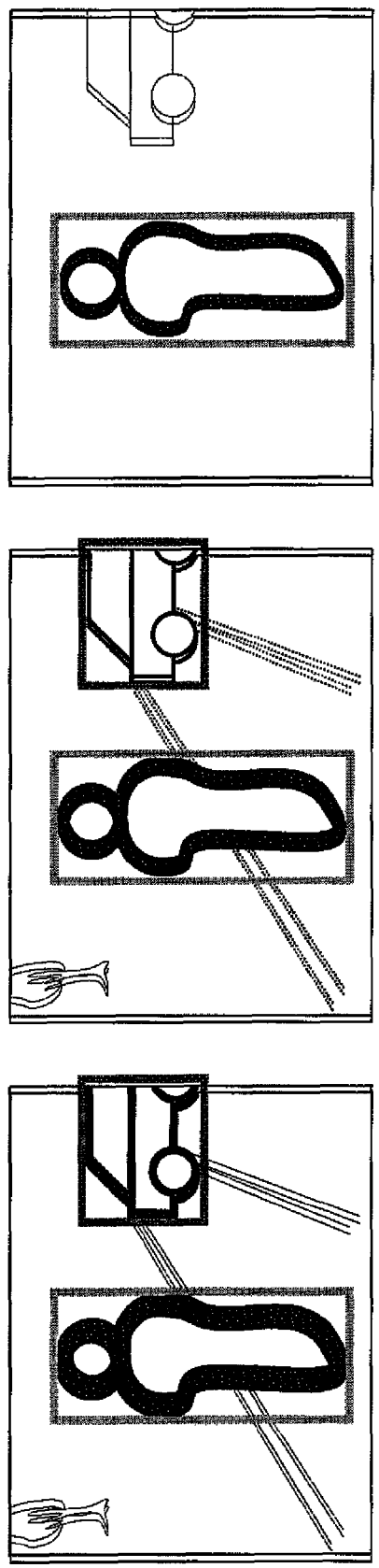
FIG. 12B is an image diagram illustrating an example of a transition of a processing result when a repetitive contraction processing is performed after image shifting.

Furthermore, in FIG. 11G, the line corresponding to the outline of the three-dimensional object on the differential image is depicted by the line with a constant thickness, however, the line corresponding to the outline of the three-dimensional object on the differential image depends on the distance L from the three-dimensional object, but actually has a certain degree of thickness, and for this reason, when the differential image is generated by image shifting together with parallax correction, as shown in FIG. 12B, particularly the thickness of the line extending in the vertical direction (the Y direction) of the image among the line corresponding to the outline of the three-dimensional object increases.

Accordingly, it may be suppressed that the differential component caused by the three-dimensional object is buried by noise on the differential image, the line corresponding to the outline of the three-dimensional object is partially discontinuous on the differential image, or the differential component caused by the three-dimensional object is unclear on the differential image. Further, as obvious from the result obtained by comparing FIG. 12A with FIG. 12B showing a case where the image shifting is not performed, since particularly the thickness of the line extending in the vertical direction (the Y direction) of the image among the line corresponding to the outline of the three-dimensional object increases, the differential component caused by the three-dimensional object is difficult to be vanished on the differential image even when the repetitive contraction processing is performed. Therefore, the detection failure or the erroneous detection of the three-dimensional object may be suppressed without increasing the baseline length b. This configuration is an example of a sixteenth aspect of the invention, and particularly, a seventeenth aspect of the invention.

Furthermore, since the differential image generated in the second embodiment is an image of which a differential between the left and right images is emphasized in the horizontal direction (the X direction), it is desirable that the contraction processing is divided into a contraction processing with respect to the horizontal direction (the X direction) of the image and a contraction processing with respect to the vertical direction (the Y direction) of the image and the number of times of performing the contraction processing with respect to the vertical direction (the Y direction) of the image is smaller than the number of times of performing the contraction processing with respect to the horizontal direction (the X direction) of the image. Accordingly, it may be suppressed that the line extending in the horizontal direction (the X direction) among the line on the differential image corresponding to the outline of the three-dimensional object is vanishing due to the repetitive contraction processing. This configuration is an example of a twentieth aspect of the invention.

Furthermore, it is desirable that the shift amount S of the second embodiment is one half of the maximum value of a correction amount (geometric parallax (parallax amount D)) in parallax correction on the basis of an experimental rule obtained by the inventor through an experiment. For example, since the maximum value of the correction amount (parallax amount D) in parallax correction is 50 pixels in the example shown in FIG. 4C, the shift amount S becomes 25 pixels or less. This configuration is an example of a twenty first aspect of the invention. In the aspect shown in FIG. 10, since the shift amount S is defined by the shift amount information input from the device control unit 26 to the delay unit 50 of the parallax correction unit 16, the shift amount S may be easily changed and set within the range of "one half of the maximum value of the correction amount (the parallax amount D) in the parallax correction" in accordance with the use purpose or the like (for example, the distance range or the like of the three-dimensional object as the focused detection target).

Figure 13:
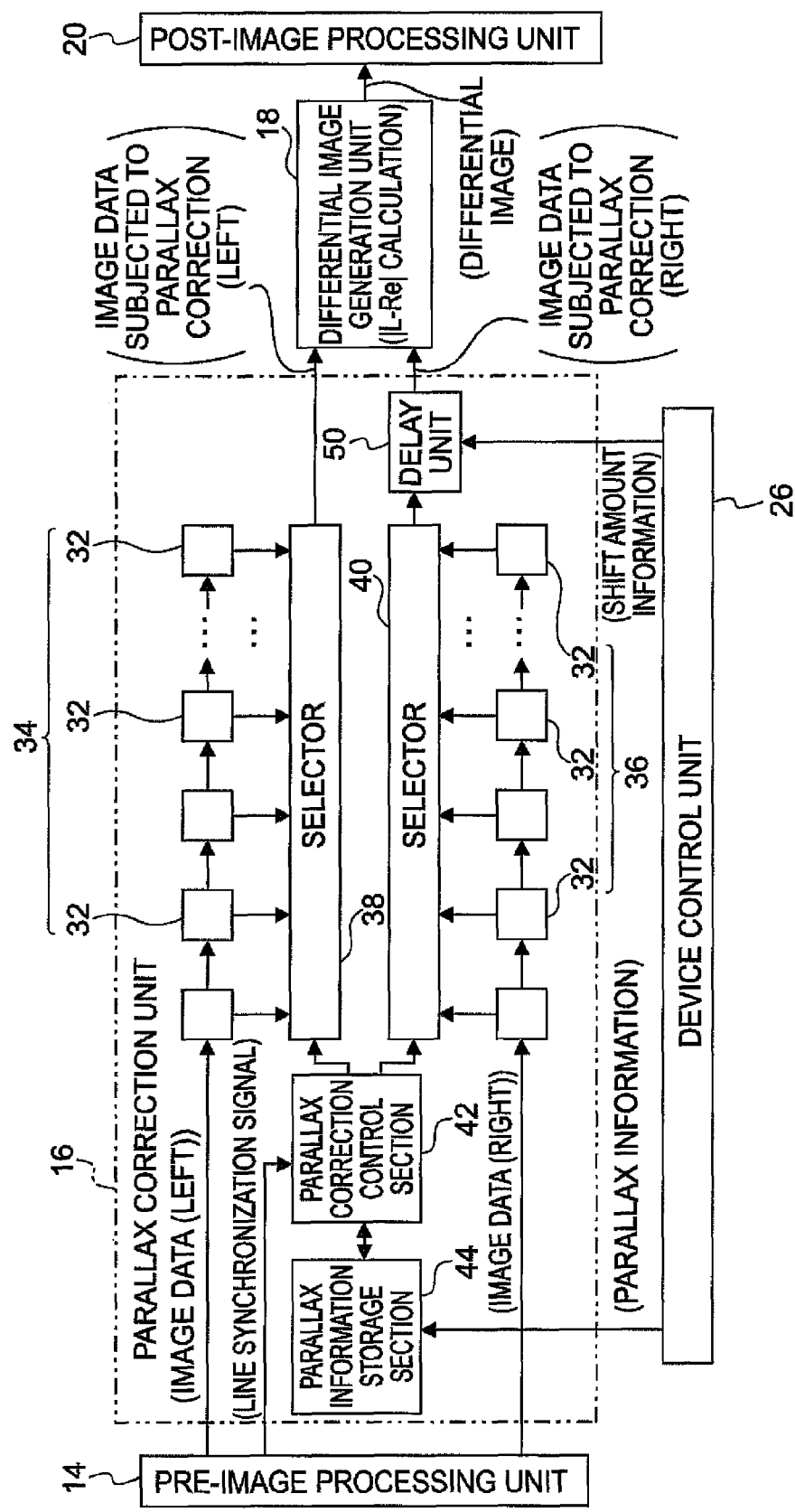
FIG. 13 is a schematic configuration diagram illustrating another example of the differential image generation unit described in the second embodiment.

Furthermore, in the configuration shown in FIG. 10, the shift (the delay of the output of the image data) is performed before the parallax correction by providing the delay unit 50 at the preceding stage of the latch group 36, but the invention is not limited thereto. As shown in FIG. 13 as an example, the image shifting may be performed after the parallax correction by providing the delay unit 50 at the subsequent stage of the selector 40 (between the selector 40 and the differential image generation unit 18). Further, in the configuration shown in FIGS. 10 and 13, the delay unit 50 performs the image shifting (the delay of the output of the image data) on the right image, but the invention is not limited thereto, the image shifting may be performed on the left image. Each of the configurations is an example of a sixteenth aspect of the invention, and particularly, a seventeenth aspect of the invention.

Figure 14:
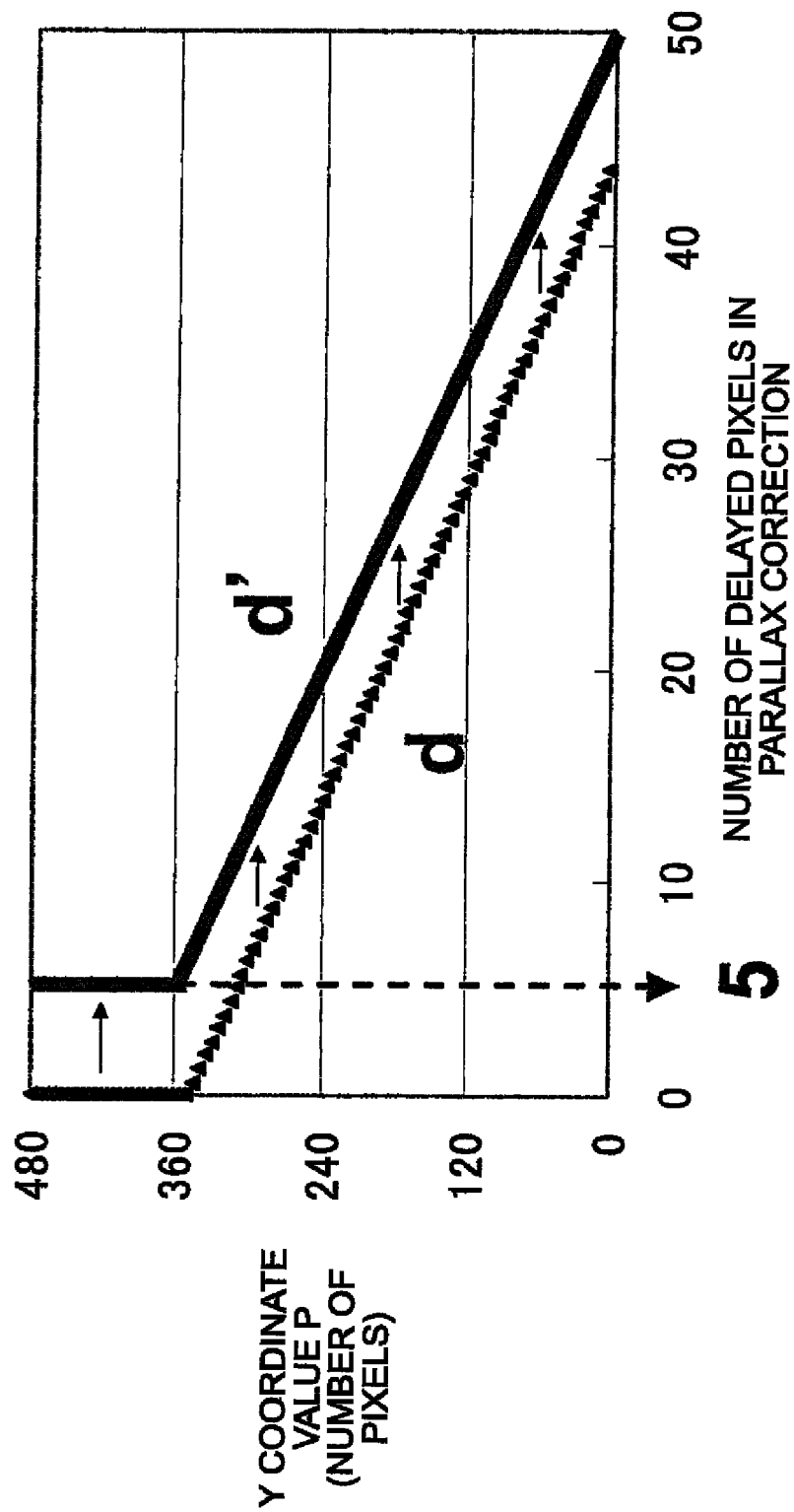
FIG. 14 is a diagrammatic view illustrating an example of contents of parallax amount information in an aspect simultaneously performing image shifting and parallax correction.

Further, in the configuration shown in FIGS. 10 and 13, the image shifting is realized by delaying the output of the image data using the delay unit 50, however, the parallax correction amount (the number of delay pixels) in the parallax correction using the parallax correction unit 16 may be set to a value obtained by adding the correction amount corresponding to the shift amount S to the correction amount corresponding to the geometric parallax (parallax amount D), and the correction of the geometric parallax (parallax amount D) and the image shifting may be simultaneously performed by the parallax correction using the parallax correction unit 16. For example, the correction amount characteristic d shown in FIG. 14 indicates the correction amount (the number of delay pixels) corresponding to the geometric parallax (parallax amount D), however, when the correction amount corresponding to the shift amount S is added to the correction amount indicated by the correction amount characteristic d (in FIG. 14, the correction amount (the number of delay pixels) corresponding to the shift amount S is set to 5), the correction amount characteristic d' shown in FIG. 14 is obtained. When the parallax correction unit 16 performs the parallax correction in accordance with the correction amount characteristic d', the geometric parallax (parallax amount D) and the image shifting by the shift amount for five pixels may be simultaneously realized without providing the delay unit 50 or the like. Accordingly, the differential image generation unit 18 generates a differential image of which a differential between the left and right images is emphasized in the horizontal direction (the X direction).

Furthermore, the configuration in which the parallax correction amount (the number of delay pixels) in the parallax correction using the parallax correction unit 16 is set to a value obtained by adding the correction amount corresponding to the shift amount S to the correction amount corresponding to the geometric parallax (parallax amount D) may be realized, for example, in a manner such that the device control unit 26 adds the shift amount S to the shift amount D when calculating the shift amount D, creates the parallax amount information by correlating the added value to the Y coordinate value, and writes the generated parallax amount information to the parallax information storage section 44 of the parallax correction unit 16. Further, the configuration may be realized in a manner such that the shift amount S is notified from the device control unit 26 to the parallax correction unit 16 and the parallax correction control section 42 of the parallax correction unit 16 adds the shift amount S to the shift amount D read out from the parallax information storage section 44 and outputs the value as a selection signal to the selectors 38 and 40. This configuration is an example of the sixteenth aspect of the invention, and particularly, an eighteenth aspect of the invention.

Figure 15:
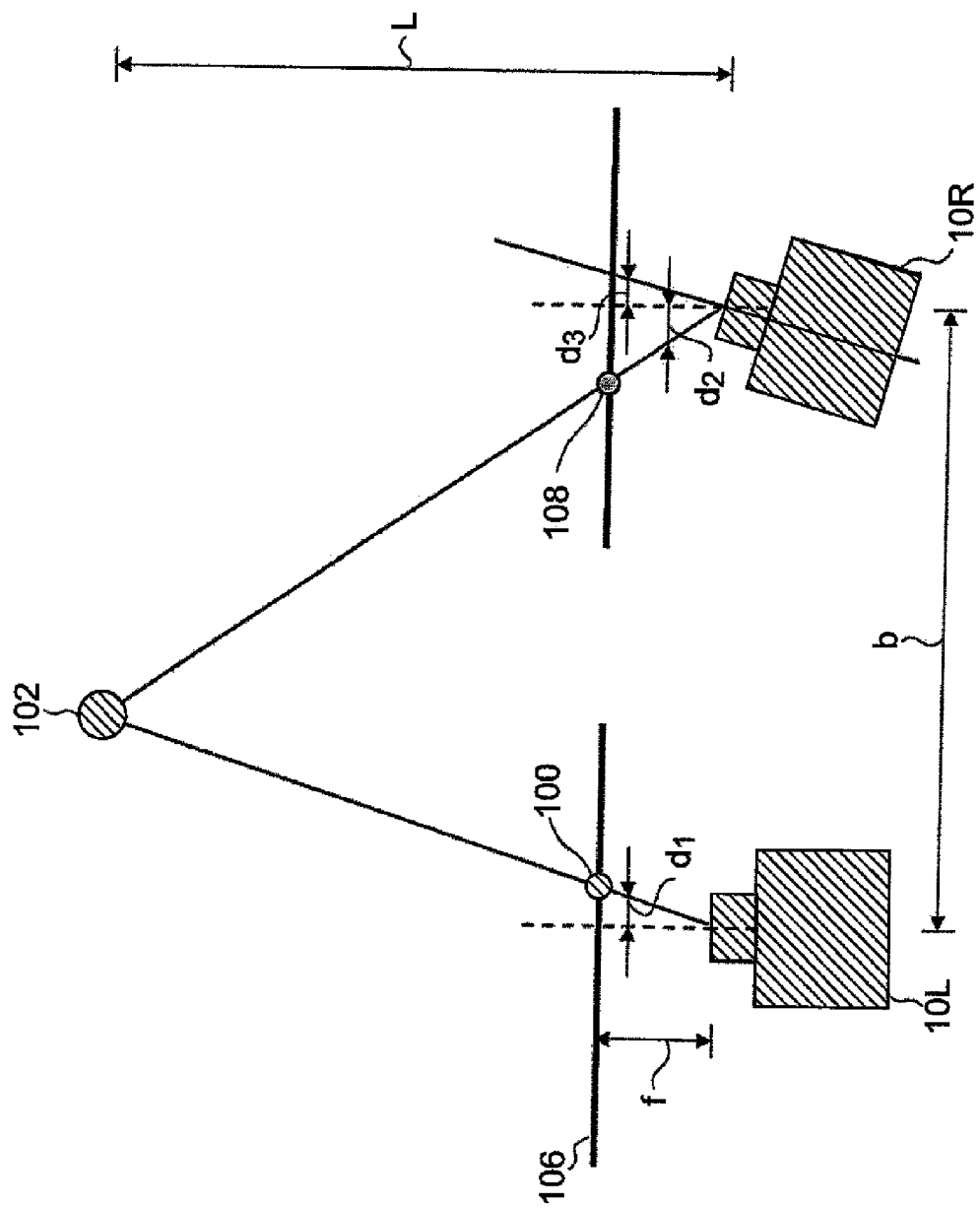
FIG. 15 is a diagrammatic view illustrating an example of contents of parallax amount information in an aspect of realizing image shifting by adjusting a direction of an imaging apparatus.

Further, the relative shifting of the left and right images in the horizontal direction (the X direction) of the image may be realized by disposing the imaging apparatuses 10L and 10R in a direction where a gap between the imaging optical axes thereof becomes larger further away from the imaging apparatuses 10L and 10R. For example, FIG. 15 illustrates an aspect in which the imaging optical axis of the imaging apparatus 10R is disposed in parallel at the outside of the imaging optical axis of the imaging apparatus 10L. Furthermore, the baseline length b of FIG. 15 is the same as that of the related art. Further, the imaging optical axis of the imaging apparatus 10L may be disposed in parallel at the outside instead of disposing the imaging optical axis of the imaging apparatus 10R at the outside in parallel, or the imaging optical axes of the imaging apparatuses 10L and 10R may be disposed at the outside in parallel.

The overall parallax amount d' obtained from the arrangement of FIG. 15 is given by the sum of the parallax amount d ($=d_1+d_2$) obtained when the imaging optical axes of the imaging apparatuses 10L and 10R are parallel to each other and the parallax amount $d_3$ obtained by disposing the imaging optical axis of the imaging apparatus 10R at the outside in parallel. The parallax amount $d_3$ is a component not depending on the distance L, and is adjusted in accordance with the shift amount S. For example, if the parallax amount $d_3$ is for five pixels and other conditions are constant, the parallax amount d is equal to the number of delay pixels (=parallax amount D) indicated by the correction amount characteristic d shown in FIG. 14, and the overall parallax amount d' is equal to the number of delay pixels (=parallax amount D+shift amount S) indicated by the correction amount characteristic d' shown in FIG. 14.

As in the aspect shown in FIGS. 10 and 13, in this aspect, the parallax correction unit 16 performs the parallax correction correcting the geometric parallax (parallax amount D), and whereby, the differential image generation unit 18 generates a differential image of which a differential between the left and right images is emphasized in the horizontal direction (the X direction) of the image. In the aspect, since the direction of at least one of the imaging apparatuses 10L and 10R needs to be adjusted in order to change the shift amount S, it is difficult to practically change the shift amount S, however, there is an advantage in that a differential image of which a differential between the left and right images is emphasized in the horizontal direction (the X direction) of the image without changing the configuration of the three-dimensional object detection apparatus 12 of the first embodiment. Furthermore, the aspect is an example of the sixteenth aspect of the invention, and particularly, a nineteenth aspect of the invention.

Further, in the above-described configuration, a case has been described in which the imaging apparatuses 10L and 10R capture an image of a subject by using natural light as illumination light without particularly installing an imaging light source, but the invention is not limited thereto, however, for example, a configuration may be adopted in which a light source emitting near-infrared light is installed as an imaging light source and the imaging apparatuses 10L and 10R capture an image of a subject by using light emitted from the light source and reflected from the subject. Further, the illumination light may be light of a wavelength except for the near-infrared light.

Further, in the above-described configuration, a case has been described in which differential information (differential image) representing a differential of intensity (or density, or brightness) in an HSV color space (here, H indicates hue, S indicates chromaticness (or saturation degree), and V indicates brightness (value)) between the first and second images as an example of the differential information (the differential image) of the invention, but the invention is not limited thereto, however, if the first and second images are color images, for example, differential information (differential image) representing a differential of chroma (or saturation degree) or color between the first and second images may be generated as the differential information (the differential image). Further, an image corresponding to the logical sum of a differential of intensity between the first and second images and a differential of hue (or saturation) between the first and second images may be generated as the differential information (the differential image) by the combination of plural parameters. Further, the differential information (the differential image) indicating a differential of intensity between both images may be generated from an image obtained by performing a filtering processing such as edge extraction on the first and second images.

Further, an aspect has been described in which the contraction processing is solely performed, however, an arbitrary filtering processing, for example, an expansion processing may be used in combination, and the contraction processing and the expansion processing may be alternately performed different number of times, for example, in a manner such that the expansion processing is performed once after performing the contraction processing of plural times. Accordingly, the fragmentation of the differential image may be prevented. Further, another image processing such as a thinning processing may be adopted instead of the combination of the contraction processing and the expansion processing.

Further, in the above-described configuration, a case has been described in which the imaging apparatuses 10L and 10R and the three-dimensional object detection apparatus 12 are mounted on the vehicle to detect the three-dimensional object (obstacle) existing in the front space of the vehicle, however, the use purpose of the image processing apparatus according to the invention is not limited thereto, for example, it is needless to say that the invention may be applied to various use purposes such as obstacle detection in a self-propelled robot.

Furthermore, the processing using the three-dimensional object detection apparatus 12 according to the embodiment may be all substituted by a processing using a computer, and the processing may be performed by a computer. In this case, a program for causing a computer to perform the processing is an example of an image processing program according to a twenty fourth aspect of the invention, where the computer serves as the image processing apparatus according to the first aspect of the invention by allowing the computer to perform the program. Further, the program may be provided while being stored in a storage medium such as a CD-ROM or a DVD-ROM. The storage medium in this configuration is an example of a storage medium according to a twenty fifth aspect of the invention.

Furthermore, the disclosure of Japanese Application (Japanese Patent Application No. 2010-065166) is incorporated by reference herein.

Further, all documents, patent applications, and technical standards described in the present specification are incorporated by reference herein as in the case where each of documents, patent applications, and technical standards is specifically described.

The invention claimed is:
1. An image processing apparatus comprising:
   a storage unit that stores bias amount information representing a bias amount, which corresponds to a parallax, along a first direction of an image corresponding to a horizontal direction between a first image captured by a first imaging apparatus and a second image captured by a second imaging apparatus which is located at a position different from that of the first imaging apparatus in the horizontal direction, with respect to each position in a second direction of the image corresponding to a vertical direction;

an acquisition unit that acquires the first image captured by the first imaging apparatus and the second image captured by the second imaging apparatus;

a processing unit that performs a parallax correction with respect to each pixel row along the first direction of the image, the parallax correction moving a position of the image in the first direction of a pixel row along the first direction of the image in accordance with the bias amount represented by the bias amount information corresponding to a position of the pixel row in the second direction of the image; and a generation unit that generates differential information representing a difference between the first image and the second image that have been subjected to the parallax correction by the processing unit, wherein the processing unit excludes a pixel row, a position of which on the image along the first direction is in a range corresponding to an upper side in the vertical direction as compared with a position corresponding to a predetermined horizontal line, from an object to be subjected to the parallax correction.

2. The image processing apparatus of claim 1, wherein:
the generation unit generates a differential image representing a difference between the first image and the second image for each pixel as the differential information; and the image processing apparatus further includes a removal unit that removes noise from the differential image by performing a contraction processing with respect to a differential pixel that exists in the differential image generated by the generation unit and that indicates a presence of the difference between the first image and the second image.

3. The image processing apparatus of claim 1, wherein the bias amount represented by the bias amount information stored in the storage unit is bias amount D which represents a bias amount by a number of pixels, and the bias amount D is derived in advance by performing operations of Equations 1 to 3 below, where a height of an imaging optical axis from a ground at installation positions of the first imaging apparatus and the second imaging apparatus is defined as h_cam, an inclination angle of the imaging optical axis with respect to a vertical direction is defined as θ, a focal length of an optical system is defined as f, the number of pixels along the first direction of the image is defined as w, the number of pixels along the second direction is defined as h, an imaging size along the first direction of the image is defined as w_img, an imaging size along the second direction is defined as h_img, a position (the number of pixels) on the image along the second direction is defined as P, and a baseline length as a distance of the imaging optical axis of the first imaging apparatus and the second imaging apparatus is defined as b:

Equation 1

$$D = b \times f / L\_cam \times (w/2)/(w\_img/2) \qquad (1)$$

wherein L_cam denotes a linear distance between an object which is positioned on the ground and which is imaged at a position (the number of pixels) P on the image along the second direction and the first imaging apparatus or the second imaging apparatus, and L denotes a distance between the object and the first imaging apparatus or the second imaging apparatus:

Equation 2

$$L\_cam = \sqrt{(h\_cam^2 + L^2)} \times \cos(\tan^{-1}(L/h\_cam) - \theta) \qquad (2)$$

Equation 3

$$L = \tan(\tan^{-1}((P-(h/2)) \times (h\_img/2)/(h/2)/f) + \theta) \times h\_cam \qquad (3).$$

4. The image processing apparatus of claim 1, wherein:
the bias amount information is information which represents a number of pixels at each position on the image along the first direction; and the processing unit includes a delay unit which delays an output of the first image or an output of the second image in units of pixels, and performs the parallax correction such that the delay unit relatively delays the output of the first image or the output of the second image by the number of pixels represented by the bias amount corresponding to a position on the image along the first direction of a pixel row to be output when the first image and the second image are output to the generation unit in units of pixels in a parallel manner, while switching the number of pixels to be delayed by the delay unit according to a change in the position on the image along the first direction of the pixel row to be output.

5. The image processing apparatus of claim 4, wherein:
the delay unit includes a plurality of serially connected delay sections which delay the output of the first image or the output of the second image by one pixel; and the processing unit selects data, which has passed through a number of the delay sections corresponding to the number of pixels represented by the bias amount corresponding to the position on the image along the first direction of the pixel row to be output, as data to be output as the first image or the second image, thereby delaying the data to be output as the first image or the second image by the number of pixels.

6. The image processing apparatus of claim 1, further comprising a correction unit that corrects at least one of a difference in imaging ranges along the horizontal direction of the first imaging apparatus and the second imaging apparatus, a difference in imaging magnifications, a difference in rotation angles around an imaging optical axis, or a difference in intensities, with respect to the first image and the second image acquired by the acquisition unit, wherein the processing unit performs the parallax correction with respect to the first image and the second image corrected by the correction unit.

7. The image processing apparatus of claim 1, further comprising a three-dimensional object detection unit that detects a three-dimensional object which exists in imaging ranges of the first imaging apparatus and the second imaging apparatus based on the differential information generated by the generation unit.

8. The image processing apparatus of claim 7, further comprising an output unit that outputs a detection result of the three-dimensional object by the three-dimensional object detection unit.

9. The image processing apparatus of claim 7, wherein:
the generation unit generates a differential image which represents the difference between the first image and the second image for each pixel as the differential information; and the three-dimensional object detection unit extracts an image area corresponding to the three-dimensional object from the differential image based on a distribution on the differential image of differential pixels which exist in the differential image generated by the generation unit and which indicate a presence of the difference between the first image and the second image, thereby detecting a position on an image of the image area corresponding to the three-dimensional object.

10. The image processing apparatus of claim 7, wherein:
the generation unit generates a differential image which represents the difference between the first image and the second image for each pixel as the differential information; and
the three-dimensional object detection unit extracts an image area corresponding to the three-dimensional object from the differential image generated by the generation unit, and detects a distance to the three-dimensional object corresponding to the image area based on a width of a linear differential area which includes differential pixels which exist in the extracted image area and which indicate a presence of the difference between the first image and the second image.

11. The image processing apparatus of claim 7, wherein:
the generation unit generates a differential image which represents the difference between the first image and the second image for each pixel as the differential information; and
the three-dimensional object detection unit extracts an image area corresponding to the three-dimensional object from the differential image generated by the generation unit, repeats a contraction processing with respect to differential pixels which exist in the differential image and which represent a presence of the difference between the first image and the second image while determining whether a linear differential area, which includes the differential pixels existing in the extracted image area, has disappeared, and detects a distance to the three-dimensional object corresponding to the image area based on a number of executions of the contraction processing at a time point at which the linear differential area has disappeared from the image area.

12. The image processing apparatus of claim 8, wherein:
the generation unit generates a differential image which represents the difference between the first image and the second image for each pixel as the differential information;
the three-dimensional object detection unit performs a contraction processing with respect to differential pixels which exist in the differential image and indicate a presence of the difference between the first image and the second image a plurality of times and determines whether a linear differential area which includes the differential pixels has disappeared from the differential image; and
the output unit outputs a three-dimensional object detection signal or switches a type of the three-dimensional object detection signal to be output according to whether a number of executions of the contraction processing is less than a threshold value at a time point at which the linear differential area has disappeared from the differential image, or whether the linear differential area has disappeared from the differential image at a time point at which the contraction processing has been performed a predetermined number of times.

13. The image processing apparatus of claim 1, wherein:
the generation unit generates a differential image which represents the difference between the first image and the second image for each pixel as the differential information; and
the image processing apparatus further includes a pixel number counting unit that counts the number of differential pixels which exist in the differential image generated by the generation unit and which indicate a presence of the difference between the first image and the second image, and outputs a counting result.

14. The image processing apparatus of claim 13, further comprising a designation unit that designates an area of the differential image, wherein the pixel number counting unit counts a number of the differential pixels which exist in the area designated from the differential image.

15. An image processing apparatus comprising:
a storage unit that stores bias amount information representing a bias amount, which corresponds to a parallax, along a first direction of an image corresponding to a horizontal direction between a first image captured by a first imaging apparatus and a second image captured by a second imaging apparatus which is located at a position different from that of the first imaging apparatus in the horizontal direction, with respect to each position in a second direction of the image corresponding to a vertical direction;
an acquisition unit that acquires the first image captured by the first imaging apparatus and the second image captured by the second imaging apparatus;
a processing unit that performs a parallax correction with respect to each pixel row along the first direction of the image, the parallax correction moving a position of the image in the first direction of a pixel row along the first direction of the image in accordance with the bias amount represented by the bias amount information corresponding to a position of the pixel row in the second direction of the image; and
a generation unit that generates differential information representing a difference between the first image and the second image that have been subjected to the parallax correction by the processing, wherein
the generation unit generates a differential image which represents a differential between the first image and the second image subjected to the parallax correction using the processing unit for each pixel,
the differential image generated by the generation unit is formed as a differential image which represents a differential between the first image and the second image in a state in which a geometric parallax is corrected by the parallax correction using the processing unit and the images are relatively shifted in the first direction by a predetermined shift amount,
the bias amount represented by the bias amount information stored in the storage unit is set as a bias amount corresponding to the geometric parallax, and
directions of the first imaging apparatus and the second imaging apparatus are set such that a distance between imaging optical axes of the first imaging apparatus and the second imaging apparatus becomes larger further away from the first and second imaging apparatuses, and the directions are adjusted such that the first image and the second image are relatively shifted in the first direction by the predetermined shift amount.

16. The image processing apparatus according to claim 15, wherein:
- the bias amount represented by the bias amount information stored in the storage unit is set as a bias amount corresponding to the geometric parallax; and
- the processing unit relatively shifts the first image and the second image in the first direction by the predetermined shift amount before or after performing the parallax correction on the first image and the second image.

17. The image processing apparatus according to claim 15, wherein the bias amount represented by the bias amount information stored in the storage unit is set as a bias amount obtained by adding a bias amount corresponding to the predetermined shift amount to a bias amount corresponding to the geometric parallax, or the bias amount represented by the bias amount information stored in the storage unit is set as the bias amount corresponding to the geometric parallax and a bias amount corresponding to the shift amount is added thereto before the bias amount is used for the parallax correction using the processing unit.

18. The image processing apparatus according to claim 15, further comprising a contraction processing unit that performs a contraction processing in the second direction for a first number of times and in the first direction for a second number of times which is greater than the first number of times, with respect to a differential pixel indicating the presence of a differential between the first image and the second image which exists in the differential image generated by the generation unit.

19. The image processing apparatus according to claim 15, wherein the shift amount is set to one half or less of a maximum value of a bias amount corresponding to the geometric parallax.

* * * * *